US012613609B2

(12) United States Patent
Negoita et al.

(10) Patent No.: US 12,613,609 B2
(45) Date of Patent: Apr. 28, 2026

(54) SYSTEMS AND METHODS OF MOTION-BASED USER INTERFACES

(71) Applicant: Apple Inc., Cupertino, CA (US)

(72) Inventors: Ioana Negoita, Mountain View, CA (US); Ian Perry, San Jose, CA (US); Trent A. Greene, Santa Clara, CA (US); Thomas J. Moore, Northglenn, CO (US); David Loewenthal, Seattle, WA (US); Brian W. Temple, Santa Clara, CA (US); Gregory Lutter, Boulder Creek, CO (US); Allison W. Dryer, Tiburon, CA (US); Thomas G. Salter, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/824,823

(22) Filed: Sep. 4, 2024

(65) Prior Publication Data

US 2025/0094016 A1 Mar. 20, 2025

Related U.S. Application Data

(60) Provisional application No. 63/583,571, filed on Sep. 18, 2023.

(51) Int. Cl.
*G06F 3/04815* (2022.01)
*G06F 3/01* (2006.01)
*G06F 3/0487* (2013.01)

(52) U.S. Cl.
CPC .......... *G06F 3/04815* (2013.01); *G06F 3/013* (2013.01); *G06F 3/0487* (2013.01)

(58) Field of Classification Search
CPC .... G06F 3/04815; G06F 3/013; G06F 3/0487; G06F 1/163; G06F 3/011; G06F 3/012; G06F 3/017; G06F 3/0346; G06F 3/04842
See application file for complete search history.

(56) References Cited

U.S. PATENT DOCUMENTS 9,619,105 B1    4/2017  Dal Mutto
9,696,855 B2 *  7/2017  Watanabe ............. G06F 3/0237
(Continued)

FOREIGN PATENT DOCUMENTS

CA            3042535  A1    5/2018
KR    10-2023-0087756  A    6/2023
WO        2016/105166  A1    6/2016

OTHER PUBLICATIONS

App Experience Spartan Trailer, Klocked Fitness [online]. Retrieved on the Internet: <https://www.klocked.me/>, [retrieved on Dec. 19, 2024], 2022, 12 pages.

(Continued)

*Primary Examiner* — Benyam Ketema

(74) *Attorney, Agent, or Firm* — Kubota & Basol LLP

(57) ABSTRACT

Some examples of the disclosure are directed to systems and methods for moving virtual objects in three-dimensional environments in accordance with detected movement of the electronic device. In some examples, the electronic device detects movement according to a first or second movement pattern described in more detail herein. In some examples, in response to detecting the first movement pattern, the electronic device applies a first correction factor to movement of a virtual object in the environment. In some examples, in response to detecting the first movement pattern, the electronic device applies a first correction factor to movement of a virtual object in the environment.

24 Claims, 12 Drawing Sheets

(56) References Cited

U.S. PATENT DOCUMENTS

| | | | | |
|---|---|---|---|---|
| 9,977,496 | B2 * | 5/2018 | Maltz | G06F 3/04845 |
| 10,353,532 | B1 * | 7/2019 | Holz | G06F 3/04847 |
| 10,607,413 | B1 * | 3/2020 | Marcolina | G06V 40/28 |
| 10,712,919 | B2 * | 7/2020 | Lee | A61B 5/1118 |
| 10,838,490 | B2 * | 11/2020 | Pace | G06F 3/013 |
| 11,150,777 | B2 * | 10/2021 | Kaehler | G06V 10/464 |
| 11,170,521 | B1 * | 11/2021 | Ben Himane | G06T 19/20 |
| 11,278,810 | B1 * | 3/2022 | Sarria, Jr. | G06F 3/0482 |
| 11,335,066 | B2 | 5/2022 | Ha et al. | |
| 11,811,876 | B2 * | 11/2023 | Berliner | G06T 15/20 |
| 11,853,533 | B1 * | 12/2023 | Chor | G06F 3/0484 |
| 11,948,263 | B1 * | 4/2024 | Rudman | G06V 20/20 |
| 12,094,070 | B2 * | 9/2024 | Terre | G06F 3/04815 |
| 12,190,579 | B2 * | 1/2025 | Gotoh | G06F 3/012 |
| 12,353,627 | B2 * | 7/2025 | Choi | G06T 11/001 |
| 2007/0035563 | A1 * | 2/2007 | Biocca | G06F 3/0346 |
| | | | | 345/633 |
| 2012/0075168 | A1 * | 3/2012 | Osterhout | G06F 3/017 |
| | | | | 345/8 |
| 2012/0306768 | A1 | 12/2012 | Bailey | |
| 2013/0335573 | A1 | 12/2013 | Forutanpour et al. | |
| 2015/0309264 | A1 * | 10/2015 | Abovitz | G02B 6/32 |
| | | | | 385/33 |
| 2016/0026253 | A1 * | 1/2016 | Bradski | H04N 13/128 |
| | | | | 345/8 |
| 2016/0257000 | A1 * | 9/2016 | Guerin | B25J 9/1671 |
| 2017/0343811 | A1 * | 11/2017 | Mese | G02B 27/0172 |
| 2018/0046363 | A1 * | 2/2018 | Miller | G06F 3/012 |
| 2018/0053337 | A1 * | 2/2018 | Nakashima | H04N 13/344 |
| 2018/0095636 | A1 * | 4/2018 | Valdivia | G06F 3/011 |
| 2018/0157398 | A1 * | 6/2018 | Kaehler | G06N 3/02 |
| 2018/0173323 | A1 * | 6/2018 | Harvey | G06F 3/011 |
| 2018/0189354 | A1 * | 7/2018 | Paine | G06F 3/0304 |
| 2018/0239144 | A1 * | 8/2018 | Woods | A63F 13/213 |
| 2018/0300897 | A1 * | 10/2018 | Woods | G06F 3/0481 |
| 2018/0350150 | A1 * | 12/2018 | Powderly | G06T 19/006 |
| 2019/0004618 | A1 * | 1/2019 | Tadros | G06F 3/012 |
| 2019/0026936 | A1 * | 1/2019 | Gorur Sheshagiri | |
| | | | | G06F 3/0304 |
| 2019/0065027 | A1 * | 2/2019 | Hauenstein | G06F 3/0484 |
| 2019/0108578 | A1 * | 4/2019 | Spivack | G09B 5/065 |
| 2019/0340649 | A1 * | 11/2019 | Ayush | G06V 10/255 |
| 2019/0366154 | A1 | 12/2019 | Callaghan | |
| 2019/0378204 | A1 * | 12/2019 | Ayush | G06Q 30/0643 |
| 2020/0035012 | A1 | 1/2020 | Mullins et al. | |
| 2020/0410766 | A1 * | 12/2020 | Swaminathan | G06T 19/006 |
| 2021/0096726 | A1 * | 4/2021 | Faulkner | G06F 3/017 |
| 2021/0097776 | A1 * | 4/2021 | Faulkner | G06V 40/113 |
| 2021/0168270 | A1 * | 6/2021 | Browne | G06F 3/011 |
| 2021/0192847 | A1 * | 6/2021 | Nagaraja | G06T 19/006 |
| 2022/0027115 | A1 * | 1/2022 | Haapoja | G09G 5/14 |
| 2022/0101593 | A1 | 3/2022 | Rockel et al. | |
| 2022/0129066 | A1 * | 4/2022 | Zahnert | G06F 3/011 |
| 2023/0396752 | A1 | 12/2023 | Jansen Dos Reis | |
| 2024/0061547 | A1 * | 2/2024 | Fleizach | G06F 3/04815 |
| 2024/0087256 | A1 * | 3/2024 | Hylak | G06F 3/012 |
| 2024/0144619 | A1 * | 5/2024 | Heitger | G06F 3/0346 |
| 2024/0193892 | A1 * | 6/2024 | Lutter | G06T 19/20 |
| 2024/0338909 | A1 * | 10/2024 | Miller | G06T 1/20 |
| 2025/0076970 | A1 * | 3/2025 | Omata | G06F 3/04815 |
| 2025/0090934 | A1 | 3/2025 | Negoita et al. | |

OTHER PUBLICATIONS

Budhiraja, et al., Interaction Techniques for HMD-HHD Hybrid AR Systems, IEEE International Symposium on Mixed and Augmented Reality, Science and Technology Proceedings, Oct. 1-4, 2013, 2013, pp. 243-244.

Dirks, Brent, What Is Action Mode on iPhone 14 and iPhone 14 Pro?, (See Walking Test video at 1:17), Retrieved on the internet: <https://www.makeuseof.com/what-is-action-mode-iphone-14-pro/>, [retrieved on: Jan. 29, 2025], Oct. 15, 2022, 6 pages.

Matsuda, Keiichi, Hyper-Reality, Hyper-Reality [online]. Retrieved on the Internet: <http://hyper-reality.co/>, [retrieved on Dec. 19, 2024], 2016, 20 pages.

\* cited by examiner

Device
201

| 202 Hand Tracking Sensor(s) | 204 Location Sensor(s) | 206 Image Sensor(s) | 209 Touch sensitive surface(s) | 210 Orientation Sensor(s) | 212 Eye Tracking Sensor(s) |

208
Communication Bus(es)

| 213 Microphone(s) | 214 Display generation component(s) | 216 Speaker(s) | 218 Processor(s) | 220 Memory(ies) | 222 Communication Circuitry |

900

902

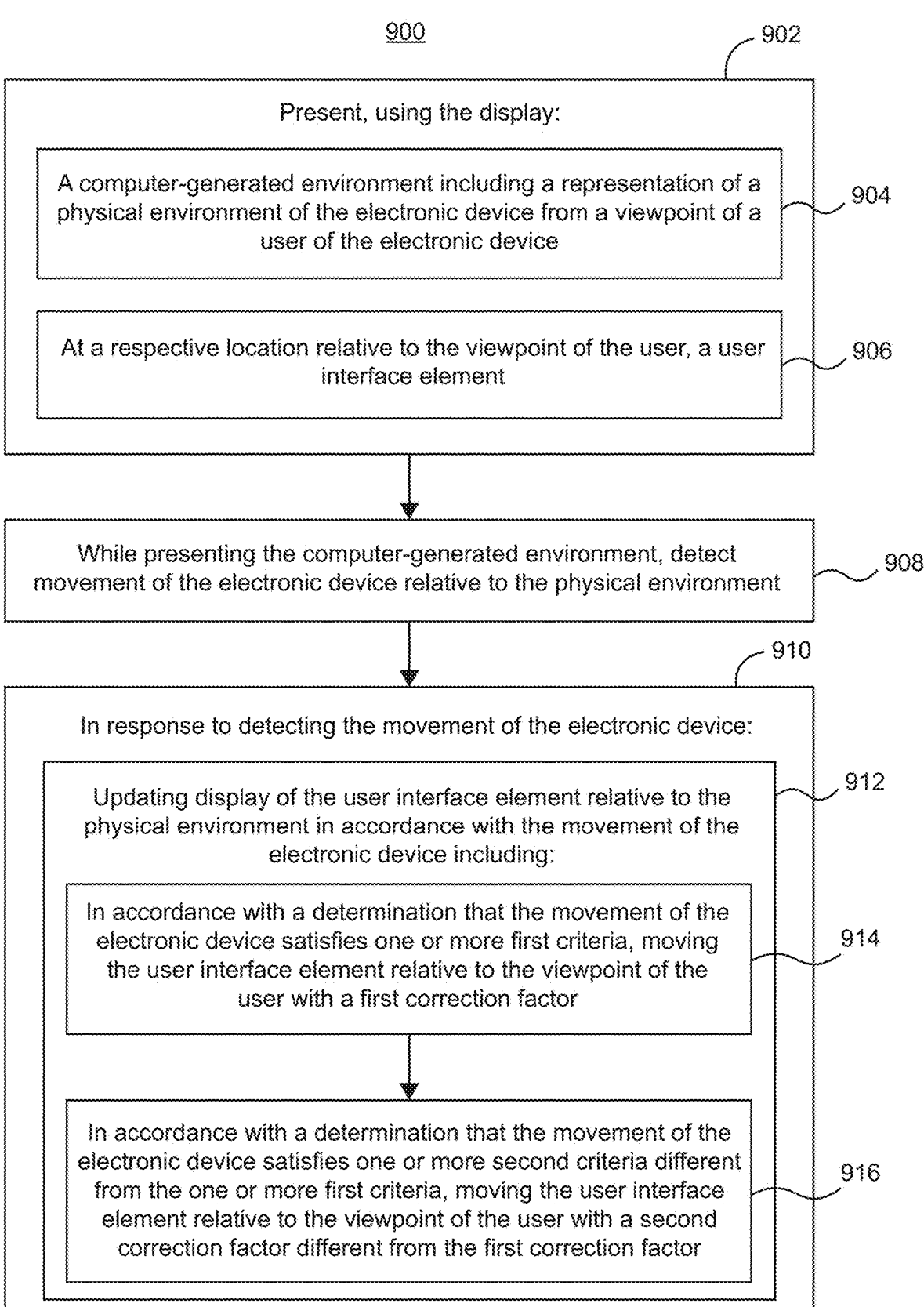

Present, using the display:

A computer-generated environment including a representation of a physical environment of the electronic device from a viewpoint of a user of the electronic device

904

At a respective location relative to the viewpoint of the user, a user interface element

906

While presenting the computer-generated environment, detect movement of the electronic device relative to the physical environment

908

910

In response to detecting the movement of the electronic device:

Updating display of the user interface element relative to the physical environment in accordance with the movement of the electronic device including:

912

In accordance with a determination that the movement of the electronic device satisfies one or more first criteria, moving the user interface element relative to the viewpoint of the user with a first correction factor

914

In accordance with a determination that the movement of the electronic device satisfies one or more second criteria different from the one or more first criteria, moving the user interface element relative to the viewpoint of the user with a second correction factor different from the first correction factor

SYSTEMS AND METHODS OF MOTION-BASED USER INTERFACES

CROSS-REFERENCE TO RELATED APPLICATIONS

This application claims the benefit of U.S. Provisional Patent Application No. 63/583,571, filed Sep. 18, 2023, the content of which is hereby incorporated by reference in its entirety for all purposes.

FIELD OF THE DISCLOSURE

This relates generally to systems and methods of displaying user interface elements in three-dimensional environments and, more particularly, to adjusting motion of user interface elements in three-dimensional environments.

BACKGROUND OF THE DISCLOSURE

Some computer graphical environments provide two-dimensional and/or three-dimensional environments where at least some objects presented for a user's viewing are virtual and generated by a computer. In some examples, some of the objects presented in the computer graphical environment are representations of real objects in the physical environment of the computer. In some examples, in response to detecting movement of the computer, the electronic device moves the representations of real objects in the physical environment of the computer to simulate movement in the computer graphical environment in accordance with movement in the physical environment.

SUMMARY OF THE DISCLOSURE

Some examples of the disclosure are directed to systems and methods for modifying movement of a virtual object displayed in a three-dimensional environment in accordance with a movement pattern of the electronic device. In some examples, in response to detecting movement of the electronic device, the electronic device updates the position(s) of one or more elements in the three-dimensional environment to maintain display of those elements as the viewpoint of the user in the three-dimensional environment moves. For example, the electronic device simulates a virtual object following the user. In some examples, when the user is walking, jogging, running, and/or sprinting while using the electronic device, the electronic device may move vertically and/or horizontally in addition to moving in the direction of travel of the user. In some examples, in response to detecting a movement pattern that includes up and down and/or side to side movement, the electronic device can adjust the movement of the virtual object with a correction factor corresponding to the detected movement pattern. For example, in response to detecting up and down movement characteristic of a first movement pattern (e.g., walking), the electronic device applies a first correction factor to the movement of the virtual object to reduce the appearance of the virtual object bouncing as the electronic device moves. As another example, in response to detecting up and down movement and/or side to side movement characteristic of a second movement pattern (e.g., running), the electronic device applies a second correction factor to the movement of the virtual object to reduce the appearance of the virtual object bouncing as the electronic device moves.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

FIG. 9 illustrates an example method of modifying movement of a virtual object displayed in a three-dimensional environment in accordance with a movement pattern of the electronic device according to some examples of the disclosure.

DETAILED DESCRIPTION

Figure 1:
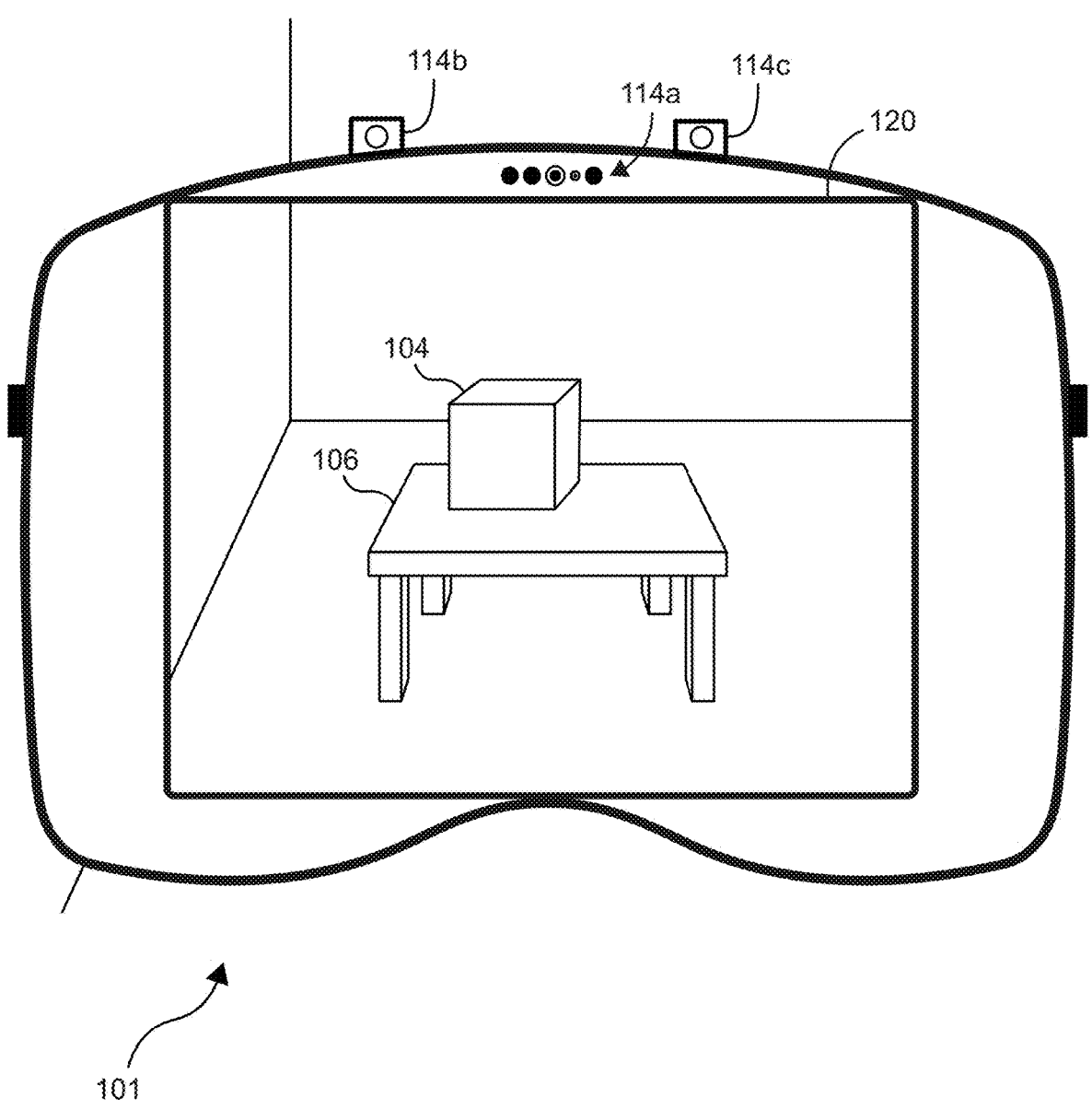
FIG. 1 illustrates an electronic device presenting an extended reality environment according to some examples of the disclosure.

Some examples of the disclosure are directed to systems and methods for modifying movement of a virtual object displayed in a three-dimensional environment in accordance with a movement pattern of the electronic device. In some examples, in response to detecting movement of the electronic device, the electronic device updates the position(s) of one or more elements in the three-dimensional environment to maintain display of those elements as the viewpoint of the user in the three-dimensional environment moves. For example, the electronic device simulates a virtual object following the user. In some examples, when the user is walking, jogging, running, and/or sprinting while using the electronic device, the electronic device may move vertically and/or horizontally in addition to moving in the direction of travel of the user. In some examples, in response to detecting a movement pattern that includes up and down and/or side to side movement, the electronic device can adjust the movement of the virtual object with a correction factor corresponding to the detected movement pattern. For example, in response to detecting up and down movement characteristic of a first movement pattern (e.g., walking), the electronic device applies a first correction factor to the movement of the virtual object to reduce the appearance of the virtual object bouncing as the electronic device moves. As another example, in response to detecting up and down movement and/or side to side movement characteristic of a second movement pattern (e.g., running), the electronic device applies a second correction factor to the movement of the virtual object to reduce the appearance of the virtual object bouncing as the electronic device moves.

In some examples, a three-dimensional object is displayed in a computer-generated three-dimensional environment with a particular orientation that controls one or more behaviors of the three-dimensional object (e.g., when the three-dimensional object is moved within the three-dimensional environment). In some examples, the orientation in which the three-dimensional object is displayed in the three-dimensional environment is selected by a user of the electronic device or automatically selected by the electronic device. For example, when initiating presentation of the three-dimensional object in the three-dimensional environment, the user may select a particular orientation for the three-dimensional object or the electronic device may automatically select the orientation for the three-dimensional object (e.g., based on a type of the three-dimensional object).

In some examples, a three-dimensional object can be displayed in the three-dimensional environment in a world-locked orientation, a body-locked orientation, a tilt-locked orientation, or a head-locked orientation, as described below. As used herein, an object that is displayed in a body-locked orientation in a three-dimensional environment has a distance and orientation offset relative to a portion of the user's body (e.g., the user's torso). Alternatively, in some examples, a body-locked object has a fixed distance from the user without the orientation of the content being referenced to any portion of the user's body (e.g., may be displayed in the same cardinal direction relative to the user, regardless of head and/or body movement). Additionally or alternatively, in some examples, the body-locked object may be configured to always remain gravity or horizon (e.g., normal to gravity) aligned, such that head and/or body changes in the roll direction would not cause the body-locked object to move within the three-dimensional environment. Rather, translational movement in either configuration would cause the body-locked object to be repositioned within the three-dimensional environment to maintain the distance offset.

As used herein, an object that is displayed in a head-locked orientation in a three-dimensional environment has a distance and orientation offset relative to the user's head. In some examples, a head-locked object moves within the three-dimensional environment as the user's head moves (as the viewpoint of the user changes).

As used herein, an object that is displayed in a world-locked orientation in a three-dimensional environment does not have a distance or orientation offset relative to the user.

As used herein, an object that is displayed in a tilt-locked orientation in a three-dimensional environment (referred to herein as a tilt-locked object) has a distance offset relative to the user, such as a portion of the user's body (e.g., the user's torso) or the user's head. In some examples, a tilt-locked object is displayed at a fixed orientation relative to the three-dimensional environment. In some examples, a tilt-locked object moves according to a polar (e.g., spherical) coordinate system centered at a pole through the user (e.g., the user's head). For example, the tilt-locked object is moved in the three-dimensional environment based on movement of the user's head within a spherical space surrounding (e.g., centered at) the user's head. Accordingly, if the user tilts their head (e.g., upward or downward in the pitch direction) relative to gravity, the tilt-locked object would follow the head tilt and move radially along a sphere, such that the tilt-locked object is repositioned within the three-dimensional environment to be the same distance offset relative to the user as before the head tilt while optionally maintaining the same orientation relative to the three-dimensional environment. In some examples, if the user moves their head in the roll direction (e.g., clockwise or counterclockwise) relative to gravity, the tilt-locked object is not repositioned within the three-dimensional environment.

FIG. 1 illustrates an electronic device 101 presenting an extended reality (XR) environment (e.g., a computer-generated environment optionally including representations of physical and/or virtual objects) according to some examples of the disclosure. In some examples, as shown in FIG. 1, electronic device 101 is a head-mounted display or other head-mountable device configured to be worn on a head of a user of the electronic device 101. Examples of electronic device 101 are described below with reference to the architecture block diagram of FIG. 2. As shown in FIG. 1, electronic device 101 and table 106 are located in a physical environment. The physical environment may include physical features such as a physical surface (e.g., floor, walls) or a physical object (e.g., table, lamp, etc.). In some examples, electronic device 101 may be configured to detect and/or capture images of physical environment including table 106 (illustrated in the field of view of electronic device 101).

In some examples, as shown in FIG. 1, electronic device 101 includes one or more internal image sensors 114a oriented towards a face of the user (e.g., eye tracking cameras described below with reference to FIG. 2). In some examples, internal image sensors 114a are used for eye tracking (e.g., detecting a gaze of the user). Internal image sensors 114a are optionally arranged on the left and right portions of display 120 to enable eye tracking of the user's left and right eyes. In some examples, electronic device 101 also includes external image sensors 114b and 114c facing outwards from the user to detect and/or capture the physical environment of the electronic device 101 and/or movements of the user's hands or other body parts.

In some examples, display 120 has a field of view visible to the user (e.g., that may or may not correspond to a field of view of external image sensors 114b and 114c). Because display 120 is optionally part of a head-mounted device, the field of view of display 120 is optionally the same as or similar to the field of view of the user's eyes. In other examples, the field of view of display 120 may be smaller than the field of view of the user's eyes. In some examples, electronic device 101 may be an optical see-through device in which display 120 is a transparent or translucent display through which portions of the physical environment may be directly viewed. In some examples, display 120 may be included within a transparent lens and may overlap all or only a portion of the transparent lens. In other examples, electronic device may be a video-passthrough device in which display 120 is an opaque display configured to display images of the physical environment captured by external image sensors 114b and 114c.

In some examples, in response to a trigger, the electronic device 101 may be configured to display a virtual object 104 in the XR environment represented by a cube illustrated in FIG. 1, which is not present in the physical environment, but is displayed in the XR environment positioned on the top of real-world table 106 (or a representation thereof). Optionally, virtual object 104 can be displayed on the surface of the table 106 in the XR environment displayed via the display 120 of the electronic device 101 in response to detecting the planar surface of table 106 in the physical environment 100.

It should be understood that virtual object 104 is a representative virtual object and one or more different virtual objects (e.g., of various dimensionality such as two-dimensional or other three-dimensional virtual objects) can be included and rendered in a three-dimensional XR environment. For example, the virtual object can represent an application or a user interface displayed in the XR environment. In some examples, the virtual object can represent content corresponding to the application and/or displayed via the user interface in the XR environment. In some examples, the virtual object 104 is optionally configured to be interactive and responsive to user input (e.g., air gestures, such as air pinch gestures, air tap gestures, and/or air touch gestures), such that a user may virtually touch, tap, move, rotate, or otherwise interact with, the virtual object 104.

In some examples, displaying an object in a three-dimensional environment may include interaction with one or more user interface objects in the three-dimensional environment. For example, initiation of display of the object in the three-dimensional environment can include interaction with one or more virtual options/affordances displayed in the three-dimensional environment. In some examples, a user's gaze may be tracked by the electronic device as an input for identifying one or more virtual options/affordances targeted for selection when initiating display of an object in the three-dimensional environment. For example, gaze can be used to identify one or more virtual options/affordances targeted for selection using another selection input. In some examples, a virtual option/affordance may be selected using hand-tracking input detected via an input device in communication with the electronic device. In some examples, objects displayed in the three-dimensional environment may be moved and/or reoriented in the three-dimensional environment in accordance with movement input detected via the input device.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
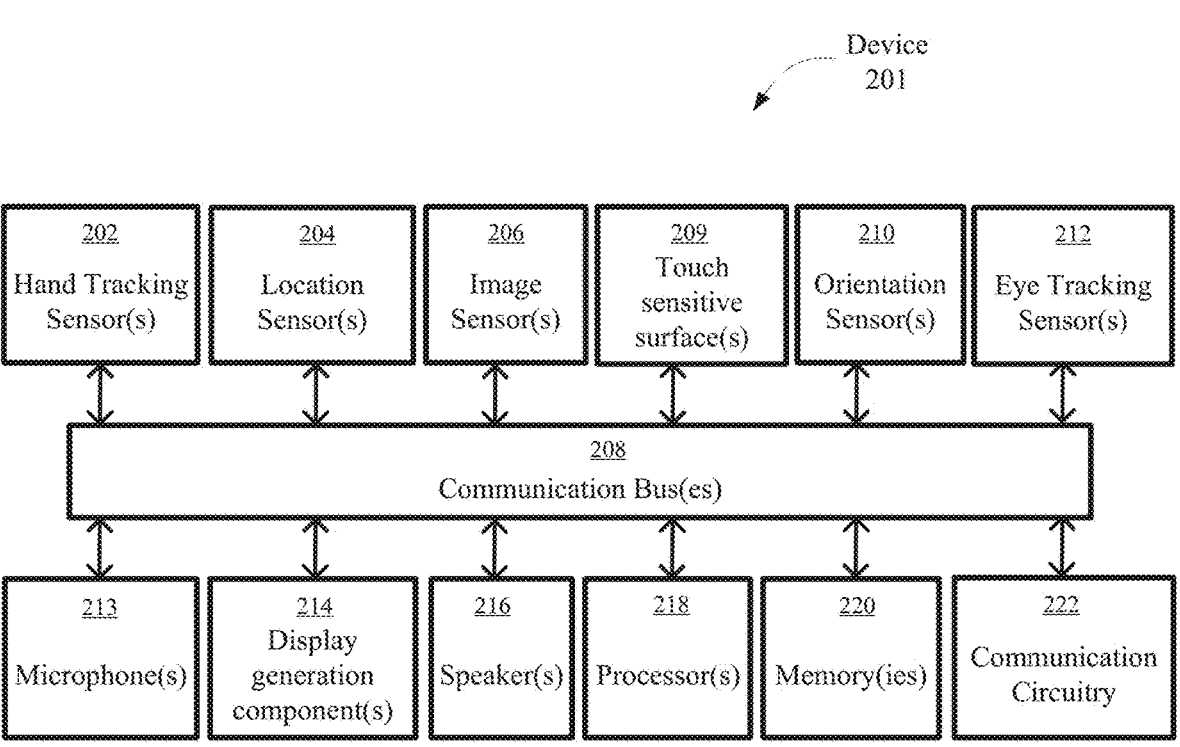
FIG. 2 illustrates a block diagram of an example architecture for a device according to some examples of the disclosure.

FIG. 2 illustrates a block diagram of an example architecture for an electronic device 201 according to some examples of the disclosure. In some examples, electronic device 201 includes one or more electronic devices. For example, the electronic device 201 may be a portable device, an auxiliary device in communication with another device, a head-mounted display, etc., respectively. In some examples, electronic device 201 corresponds to electronic device 101 described above with reference to FIG. 1.

As illustrated in FIG. 2, the electronic device 201 optionally includes various sensors, such as one or more hand tracking sensors 202, one or more location sensors 204, one or more image sensors 206 (optionally corresponding to internal image sensors 114a and/or external image sensors 114b and 114c in FIG. 1), one or more touch-sensitive surfaces 209, one or more motion and/or orientation sensors 210, one or more eye tracking sensors 212, one or more microphones 213 or other audio sensors, one or more body tracking sensors (e.g., torso and/or head tracking sensors), one or more display generation components 214, optionally corresponding to display 120 in FIG. 1, one or more speakers 216, one or more processors 218, one or more memories 220, and/or communication circuitry 222. One or more communication buses 208 are optionally used for communication between the above-mentioned components of electronic devices 201.

Communication circuitry 222 optionally includes circuitry for communicating with electronic devices, networks, such as the Internet, intranets, a wired network and/or a wireless network, cellular networks, and wireless local area networks (LANs). Communication circuitry 222 optionally includes circuitry for communicating using near-field communication (NFC) and/or short-range communication, such as Bluetooth®.

Processor(s) 218 include one or more general processors, one or more graphics processors, and/or one or more digital signal processors. In some examples, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some examples, memory 220 can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on compact disc (CD), digital versatile disc (DVD), or Blu-ray technologies, as well as persistent solid-state memory such as flash, solid-state drives, and the like.

In some examples, display generation component(s) 214 include a single display (e.g., a liquid-crystal display (LCD), organic light-emitting diode (OLED), or other types of display). In some examples, display generation component(s) 214 includes multiple displays. In some examples, display generation component(s) 214 can include a display with touch capability (e.g., a touch screen), a projector, a holographic projector, a retinal projector, a transparent or translucent display, etc. In some examples, electronic device 201 includes touch-sensitive surface(s) 209, respectively, for receiving user inputs, such as tap inputs and swipe inputs or other gestures. In some examples, display generation component(s) 214 and touch-sensitive surface(s) 209 form touch-sensitive display(s) (e.g., a touch screen integrated with electronic device 201 or external to electronic device 201 that is in communication with electronic device 201).

Electronic device 201 optionally includes image sensor(s) 206. Image sensors(s) 206 optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras configured to capture movement of physical objects in the real-world environment. Image sensor(s) 206 also optionally include one or more depth sensors configured to detect the distance of physical objects from electronic device 201. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, electronic device 201 uses CCD sensors, event cameras, and depth sensors in combination to detect the physical environment around electronic device 201. In some examples, image sensor(s) 206 include a first image sensor and a second image sensor. The first image sensor and the second image sensor work in tandem and are optionally configured to capture different information of physical objects in the real-world environment. In some examples, the first image sensor is a visible light image sensor, and the second image sensor is a depth sensor. In some examples, electronic device 201 uses image sensor(s) 206 to detect the position and orientation of electronic device 201 and/or display generation component(s) 214 in the real-world environment. For example, electronic device 201 uses image sensor(s) 206 to track the position and orientation of display generation component(s) 214 relative to one or more fixed objects in the real-world environment.

In some examples, electronic device 201 includes microphone(s) 213 or other audio sensors. Electronic device 201 optionally uses microphone(s) 213 to detect sound from the user and/or the real-world environment of the user. In some examples, microphone(s) 213 includes an array of microphones (a plurality of microphones) that optionally operate in tandem, such as to identify ambient noise or to locate the source of sound in space of the real-world environment.

Electronic device 201 includes location sensor(s) 204 for detecting a location of electronic device 201 and/or display generation component(s) 214. For example, location sensor(s) 204 can include a global positioning system (GPS) receiver that receives data from one or more satellites and allows electronic device 201 to determine the device's absolute position in the physical world.

Electronic device 201 includes orientation sensor(s) 210 for detecting orientation and/or movement of electronic device 201 and/or display generation component(s) 214. For example, electronic device 201 uses orientation sensor(s) 210 to track changes in the position and/or orientation of electronic device 201 and/or display generation component(s) 214, such as with respect to physical objects in the real-world environment. Orientation sensor(s) 210 optionally include one or more gyroscopes and/or one or more accelerometers.

Electronic device 201 includes hand tracking sensor(s) 202 and/or eye tracking sensor(s) 212 (and/or other body tracking sensor(s), such as leg, torso and/or head tracking sensor(s)), in some examples. Hand tracking sensor(s) 202 are configured to track the position/location of one or more portions of the user's hands, and/or motions of one or more portions of the user's hands with respect to the extended reality environment, relative to the display generation component(s) 214, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214. In some examples, hand tracking sensor(s) 202 and/or eye tracking sensor(s) 212 are implemented together with the display generation component(s) 214. In some examples, the hand tracking sensor(s) 202 and/or eye tracking sensor(s) 212 are implemented separate from the display generation component(s) 214.

In some examples, the hand tracking sensor(s) 202 (and/or other body tracking sensor(s), such as leg, torso and/or head tracking sensor(s)) can use image sensor(s) 206 (e.g., one or more IR cameras, 3D cameras, depth cameras, etc.) that capture three-dimensional information from the real-world including one or more hands (e.g., of a human user). In some examples, the hands can be resolved with sufficient resolution to distinguish fingers and their respective positions. In some examples, one or more image sensors 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by one or more respective eye tracking cameras/illumination sources.

Electronic device 201 is not limited to the components and configuration of FIG. 2, but can include fewer, other, or additional components in multiple configurations. In some examples, electronic device 201 can be implemented between two electronic devices (e.g., as a system). In some such examples, each of (or more) electronic device may each include one or more of the same components discussed above, such as various sensors, one or more display generation components, one or more speakers, one or more processors, one or more memories, and/or communication circuitry. A person or persons using electronic device 201, is optionally referred to herein as a user or users of the device.

Attention is now directed towards interactions with one or more virtual objects that are displayed in a three-dimensional environment presented at an electronic device (e.g., corresponding to electronic device 201). In some examples, the electronic device adjusts the motion of the one or more virtual objects in accordance with a detected movement pattern of the electronic device.

Figure 3A:
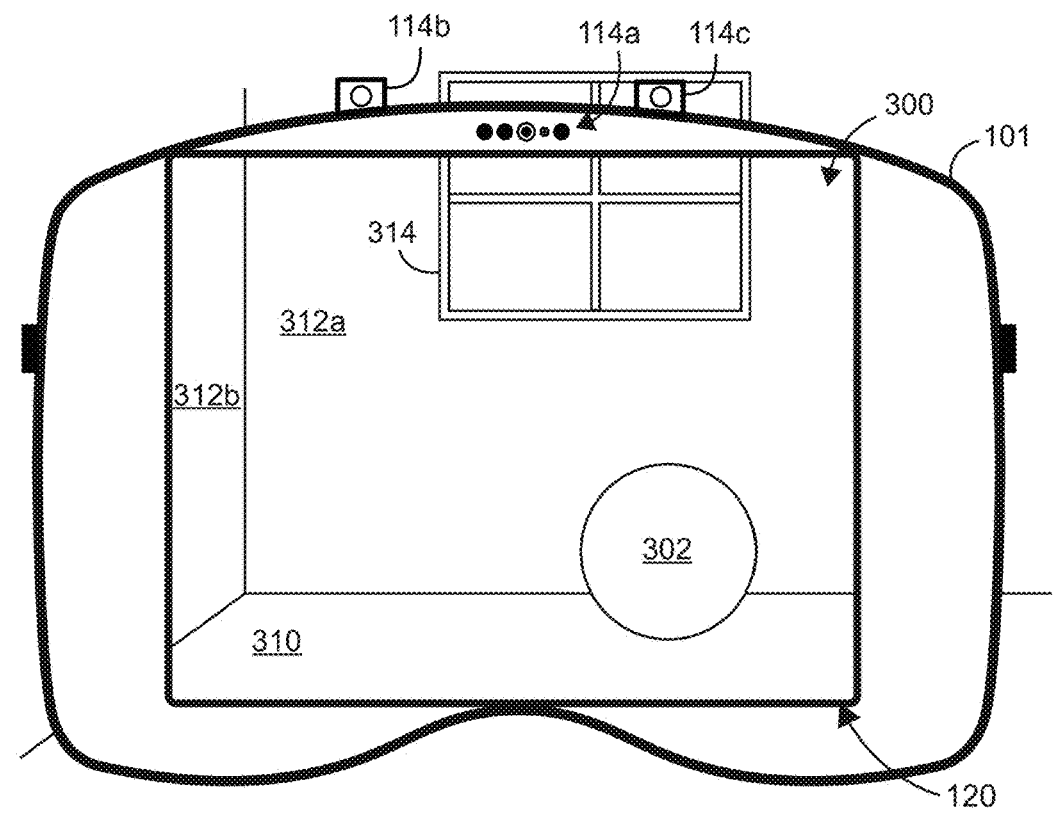
FIGS. 3A-3C illustrate examples of an electronic device updating the position of a virtual object in a three-dimensional environment in accordance with movement of the electronic device according to some examples of the disclosure.
Figure 3B:
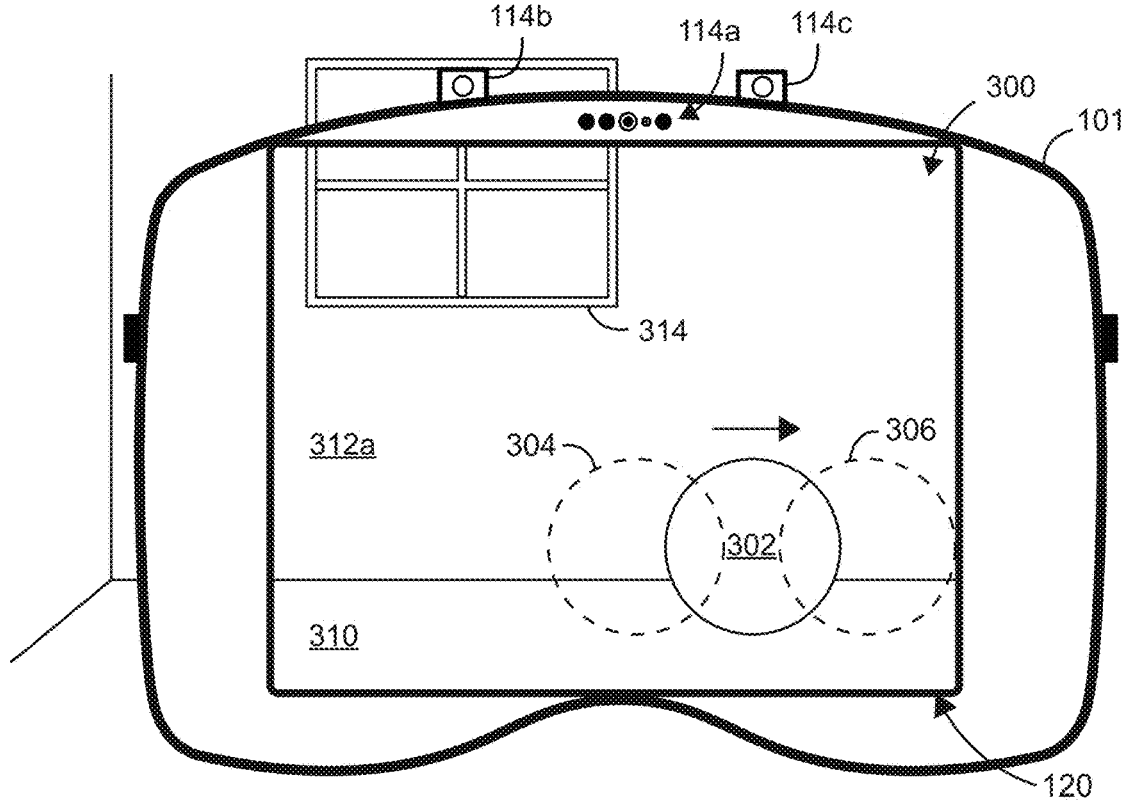
Figure 3C:
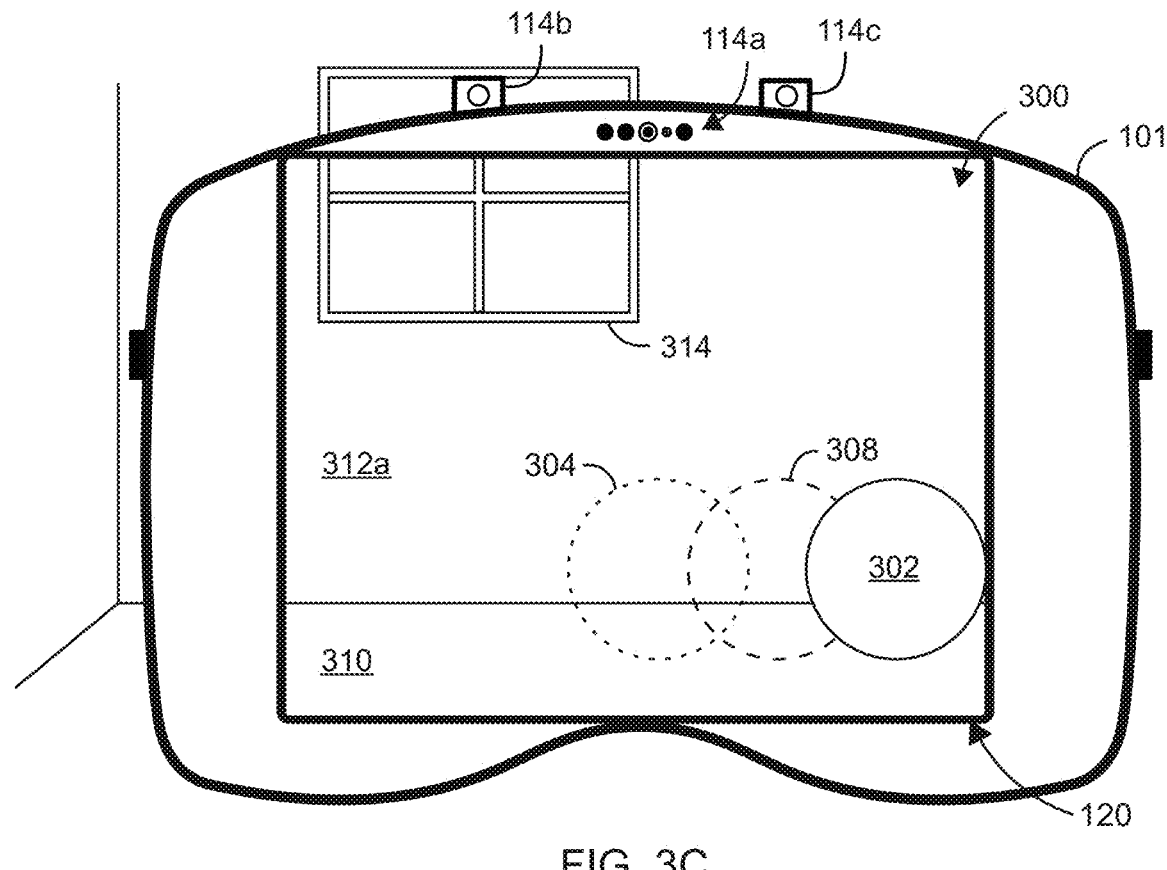

FIGS. 3A-3C illustrate examples of an electronic device 101 updating the position of a virtual object 302 in a three-dimensional environment 300 in accordance with movement of the electronic device 101 according to some examples of the disclosure. In FIG. 3A, for example, the electronic device 101 presents a three-dimensional environment 300 that includes representations of real objects in the environment of the electronic device 101 and virtual object 302. In some examples, the three-dimensional environment 300 is a computer-generated environment, such as an extended reality environment. For example, the three-dimensional environment 300 can include a representation 310 of a real floor, representations 312a and 312b of real walls, and a representation 314 of a real window in the physical environment of the electronic device 101. The electronic device 101 optionally presents these representations 310, 312a, 312b, and 314 as optical see-through in which portions of the physical environment of the electronic device 101 are visible through a transparent or translucent portion of the display and/or video passthrough in which the electronic device 101 uses the display to display representations of the physical environment captured by the electronic device 101. In some examples, virtual object 302 is a user interface element, a content item, or another virtual object that the electronic device 101 displays using the display.

In some examples, the electronic device 101 presents the three-dimensional environment 300 from a viewpoint of the user of the electronic device 101. For example, the viewpoint of the user of the electronic device 101 is a location in the three-dimensional environment 300 that corresponds to a location of the electronic device 101 in the physical environment of the electronic device 101. For example, in FIG. 3A, the electronic device 101 presents the three-dimensional environment 300 including a view of the representation 314 of the real window that would correspond to the user's view of the real window in the physical environment at the location and orientation of the electronic device 101 while the electronic device 101 presents the three-dimensional environment 300 as shown in FIG. 3A.

In some examples, in response to detecting movement of the electronic device 101, the electronic device 101 updates the three-dimensional environment 300 in accordance with the movement of the electronic device 101 to simulate movement through the three-dimensional environment 300 that corresponds to the movement of the electronic device 101 in the physical environment. As shown in FIG. 3A, the electronic device 101 optionally detects movement of the electronic device 101 to the right. In some examples, in response to detecting the movement of the electronic device 101 illustrated in FIG. 3A, the electronic device 101 updates the three-dimensional environment 300 as shown in FIG. 3B. As shown in FIG. 3B, for example, in response to detecting the movement of the electronic device 101 illustrated in FIG. 3A, the electronic device 101 updates the locations at which the representations 310, 312a, and 314 of various real objects are displayed relative to the display area of the display. In some examples, updating the display of representations 310, 312a, and 314 of the real objects in a manner corresponding to the movement of the electronic device 101 in the physical environment simulates the corresponding motion in the three-dimensional environment 300. For example, the electronic device 101 moves the representations 310, 312a, and 314 within the display area with minimal delay after detecting the motion of the electronic device 101. It should be appreciated that in optical see-through implementations of electronic device 101, movement of representations 310, 312a, and 314 within the transparent or translucent display would occur naturally without electronic device 101 having to actively update their locations within the display.

In some examples, the virtual object 302 may be a head-locked object and the electronic device 101 may update the position of the virtual object 302 in the three-dimensional environment 300 based on a change to the pose of the user's head such that it remains in the same location of the display of electronic device 101. In other examples, the virtual object 302 may be a head-locked object and the electronic device 101 may update the position of the virtual object 302 in the three-dimensional environment 300 based on a change to the pose of the user's head with a dampening effect to simulate the virtual object 302 following the user with a delay. In some examples, the electronic device 101 simulates the delay in motion of the virtual object 302 by applying dampening to the position, speed, and/or acceleration of the virtual object 302 in the three-dimensional environment relative to the position, speed, and/or acceleration of the electronic device 101 in the physical environment. At a first time, as shown for example in FIG. 3A, the virtual object 302 can have a respective location relative to the three-dimensional environment 300 and a respective location relative to the viewpoint of the user. At a second time after the first time, as shown for example in FIG. 3B, the virtual object 302 can have a different respective location relative to the three-dimensional environment 300 and a different respective location relative to the viewpoint of the user than those locations in FIG. 3A during the first time. To illustrate this concept, FIG. 3B includes indications of locations 304 and 306, which will now be described. For example, location 304 is the location at which the electronic device 101 would display virtual object 302 if the position of the virtual object 302 relative to the three-dimensional environment 300 did not change between FIG. 3A and FIG. 3B in response to the movement of the electronic device 101 (e.g., no movement, infinite dampening, or no interpolation of movement relative to the user's head). As another example, location 306 is the location at which the electronic device 101 would display the virtual object 302 if the position of the virtual object 302 relative to the viewpoint of the user did not change between FIG. 3A and FIG. 3B in response to the movement of the electronic device 101 (e.g., no dampening or maximum interpolation of movement relative to the user's head). In some examples, in FIG. 3B, the electronic device 101 displays the virtual object 302 between locations 304 and 306 because the electronic device 101 moves the virtual object 302 in accordance with the movement of the electronic device 101 with an amount of dampening that is greater than zero. For example, the electronic device 101 displays the virtual object 302 at a location that is a linear interpolation between location 304 (e.g., corresponding to no movement, infinite dampening, or minimal interpolation) and location 306 (e.g., corresponding to no dampening or maximum interpolation). In some examples, applying more interpolation can correspond to less dampening and applying less interpolation can correspond to more dampening. FIG. 3B includes indications of locations 304 and 306 for the purpose of discussion but, in some examples, the electronic device 101 does not display indications of locations 304 and 306.

In some examples, when the electronic device 101 stops moving for a period of time corresponding to the delay of the motion of virtual object 302, the electronic device 101 displays the virtual object 302 at the same location relative to the viewpoint of the user as the location of the virtual object 302 relative to the viewpoint of the user in FIG. 3A. For example, in FIG. 3C, the viewpoint of the user is at the same location in the three-dimensional environment 300 as the viewpoint of the user in FIG. 3B and the location of the virtual object 302 relative to the viewpoint of the user is the same as in FIG. 3A. For the sake of illustration, FIG. 3C also includes an indication of the location 304 of the virtual object 302 relative to the three-dimensional environment 300 in FIG. 3A and an indication of the location 308 of the virtual object 302 relative to the three-dimensional environment 300 in FIG. 3B. In some examples, the electronic device 101 does not display indications of locations 304 and 308; indications of locations 304 and 308 are provided for the purpose of explanation to illustrate the delay in displaying the virtual object 302 at the location 304 shown in FIG. 3A, to displaying the virtual object 302 at the location 308 shown in FIG. 3B, to displaying the virtual object 302 at the location shown in FIG. 3C (e.g., location 306 in FIG. 3B).

Moving virtual object 302 in the three-dimensional environment 300 with a delay can improve the user experience by dampening movement of the virtual object 302 in response to slight shifts in the location of the electronic device 101 as well as preventing the sensation that the virtual object 302 is rigidly attached to the electronic device, which could be distracting or uncomfortable to the user. Moreover, in some situations, moving virtual object 302 with the delay can enable the electronic device 101 to smooth the motion of the virtual object 302 while still moving the virtual object 302 in accordance with the speed and/or direction of movement of the electronic device 101 and maintain display of the virtual object 302 within the field of view of the display in the three-dimensional environment 300. In some examples, the amount of dampening of the motion of the virtual object 302 can depend on one or more parameters of the interpolation applied by the electronic device 101 to the location of the virtual object 302 over time in accordance with movement by the electronic device 101. Example parameters of the interpolation include relative weighting between locations 304 and 306 and/or a period of time delay with which the electronic device 101 applies the interpolation.

When people walk or run, their heads can move in directions and/or dimensions other than the direction of travel. Thus, in examples in which electronic device 101 is a head-mounted display or includes a head-mounted display, the electronic device 101 may also move in directions and/or dimensions other than the direction of travel during use. For example, when walking, the user's head may move up and down in accordance with the user's steps in addition to moving in the direction of travel. As another example, when running, the user's head may move up and down and side to side in accordance with the user's steps in addition to moving in the direction of travel. While a person is walking or running, the human brain may ignore the motion of the user's environment relative to the user's head in directions other than the direction of travel, such as up and down and/or left to right in accordance with the user's steps. However, in some situations, the human brain is not as readily able to ignore this motion for virtual objects displayed by an electronic device simulating those elements following the user. For example, a virtual object displayed with no delay in motion up and down and/or left to right could appear to the user as moving around and/or bouncing, which could be distracting or uncomfortable to the user or make it difficult for the user to focus on the virtual object. As another example, a virtual object displayed with the same motion up and down and/or side to side as the movement of the user's head while running or walking could appear to be bouncing, moving around, and/or floating in a manner that is distracting or uncomfortable to the user. Thus, in some examples, the electronic device 101 applies a correction factor to the movement of virtual objects to adjust the delay and/or dampening in motion of the virtual object in accordance with the user's steps (e.g., up and down and/or side to side), as described below with reference to FIGS. 4A-9.

Figure 4A:
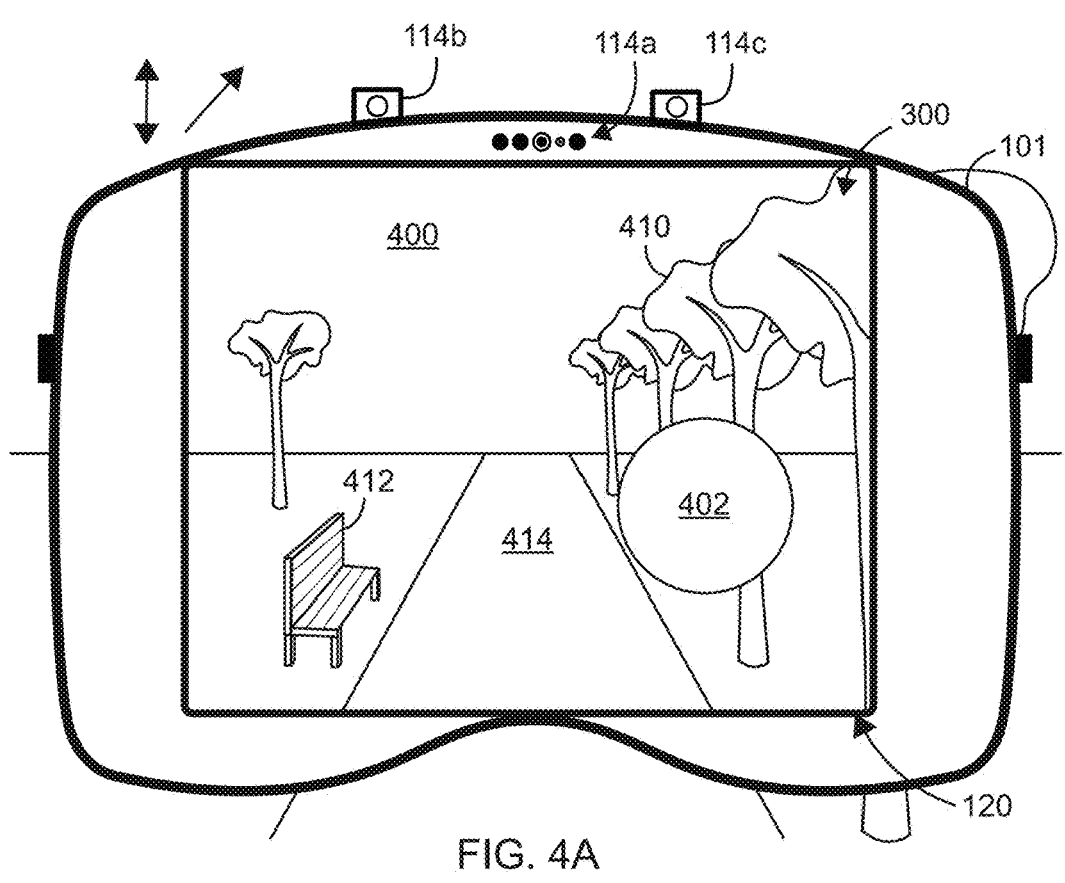
FIGS. 4A-4B illustrate examples of an electronic device applying a first correction factor to motion of a virtual object while the electronic device moves with a first movement pattern according to examples of the disclosure.
Figure 4B:
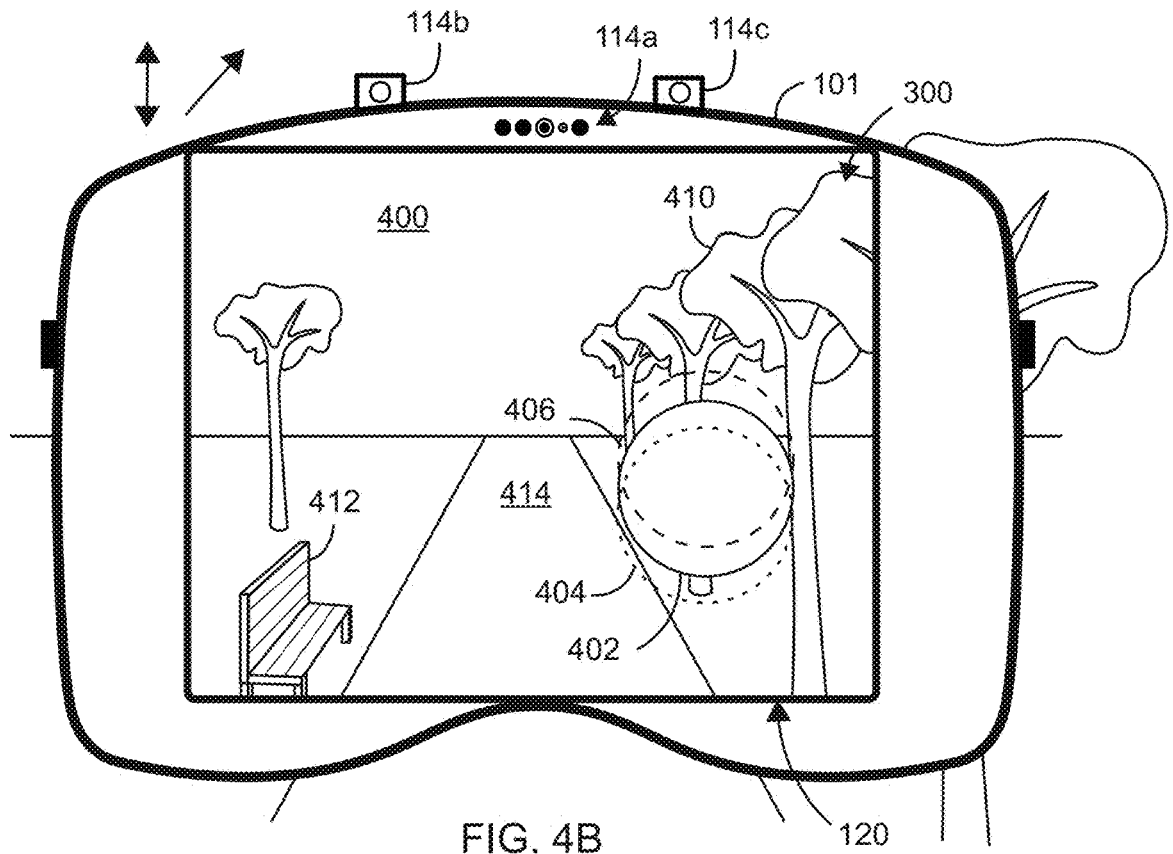

FIGS. 4A-4B illustrate examples of an electronic device 101 applying a first correction factor to motion of a virtual object 402 while the electronic device 101 moves with a first movement pattern according to examples of the disclosure. In some examples, the first movement pattern can correspond to the user walking and a second movement pattern, described below, can correspond to the user running. In some examples, the first movement pattern can correspond to the user jogging or running and a second movement pattern, described below, can correspond to the user sprinting. Other movement patterns are possible without departing from the scope of the disclosure.

In some examples, the electronic device 101 uses one or more first criteria to identify the first movement pattern. For example, the one or more first criteria include a criterion that is satisfied when the electronic device 101 detects periodic and/or repeating motion up and down by a threshold amount (e.g., distance, speed and/or frequency) corresponding to the user's steps while moving according to the first movement pattern (e.g., walking, jogging, or running according to the first movement pattern). As another example, the one or more first criteria include a criterion that is satisfied when the electronic device 101 detects side to side periodic and/or repeating movement by less than a threshold amount (e.g., distance, speed, and/or frequency) that would correspond to the user's steps in a different movement pattern (e.g., running or sprinting according to the second movement pattern). As another example, the one or more first criteria include a criterion that is satisfied when the electronic device 101 detects motion of the electronic device 101 in the direction of travel in which the user is moving, such as forward motion as the user walks, runs, or jogs in the first movement pattern.

FIG. 4A illustrates an example of the electronic device 101 presenting a three-dimensional environment 400 including representations 410, 412, and 414 of real objects in the physical environment of the electronic device 101 and virtual object 402. For example, the three-dimensional environment 400 includes a representation 410 of a tree, a representation 412 of a bench, and a representation 414 of a path. In some examples, the electronic device 101 uses optical see-through or video passthrough techniques described herein to present the representations 410 through 414 of real objects. In some examples, virtual object 402 is a user interface element, a content item, or another virtual object that the electronic device 101 displays using the display. In some examples, the electronic device 101 displays the virtual object 402 to simulate the virtual object 402 following the user as the viewpoint of the user moves through the three-dimensional environment 400. As described herein, in some examples, the electronic device 101 applies the first correction factor corresponding to the first movement pattern of the electronic device 101 when moving the virtual object 402 in the three-dimensional environment 400. For example, as shown in FIG. 4A, the electronic device 101 detects motion of the electronic device 101 in a direction of travel and motion of the electronic device 101 up and down corresponding to the first movement pattern (e.g., walking, jogging, or running). In some examples, the first correction factor applies to the delay in motion of virtual object 402 in response to the up and down motion of the electronic device 101, but optionally not to the motion of the electronic device 101 in the direction of travel.

FIG. 4B illustrates an example of the electronic device 101 applying the first correction factor to the movement of virtual object 402 in accordance with the first movement pattern of the electronic device 101. In FIG. 4B, for example, the user has walked along the path in a direction of travel from the location of the electronic device 101 in FIG. 4A and, while the user is walking, the electronic device 101 has moved up vertically in accordance with the user's steps. As shown in FIG. 4B, the presentation of representations 410 through 414 are updated in accordance with the updated position of the electronic device 101 in the physical environment, for example. As also shown in the example of FIG. 4B, the electronic device 101 updates the position of virtual object 402 in the direction of travel of the electronic device 101 to simulate the virtual object 402 following the user and to maintain display of the virtual object 402 as the electronic device 101 moves in the physical environment.

In some examples, the electronic device 101 applies the first correction factor to the up and down motion of virtual object 402 while the electronic device 101 is moving with the first movement pattern. For example, the electronic device 101 displays the virtual object 402 at the location shown in FIG. 4B because the electronic device 101 moves the virtual object 402 up and down with a speed and/or distance that is greater than zero but less than the speed and/or distance of the up and down movement of the viewpoint of the user relative to the physical environment. To illustrate this concept, FIG. 4B includes indications of locations 404 and 406, which will now be described. For example, location 404 is the location at which the electronic device 101 would display the virtual object 402 if the height of the object was fixed in the three-dimensional environment 400 (e.g., corresponding to no movement, or to infinite dampening) instead of moving with the first correction factor. For example, location 406 is the location at which the electronic device 101 would display the virtual object 402 if the electronic device 101 moved the virtual object up and down with the same motion as the up and down movement of the electronic device 101 (e.g., no dampening) instead of moving with the first correction factor. In some examples, in FIG. 4B, the electronic device 101 displays virtual object 402 between locations 404 and 406 because the electronic device 101 applies the first correction factor to the up and down motion of the virtual object 402. For example, the electronic device 101 displays the virtual object 402 at a location that is a linear interpolation between location 404 (e.g., corresponding to no movement or to infinite dampening) and location 406 (e.g., corresponding to no dampening). In some examples, the electronic device 101 does not display indications of locations 404 and 406; these indications are included in FIG. 4B for the purpose of illustration and explanation. In some examples, the electronic device 101 applies dampening and/or linear interpolation to the (e.g., position, speed, and/or acceleration) of the motion of the virtual object 402 in the direction of travel of the electronic device 101 that is different from the first correction factor applied to the up and down motion of the first movement pattern. For example, the first correction factor includes applying more dampening to the up and down motion than the amount of dampening applied to motion in the direction of travel.

Figure 5A:
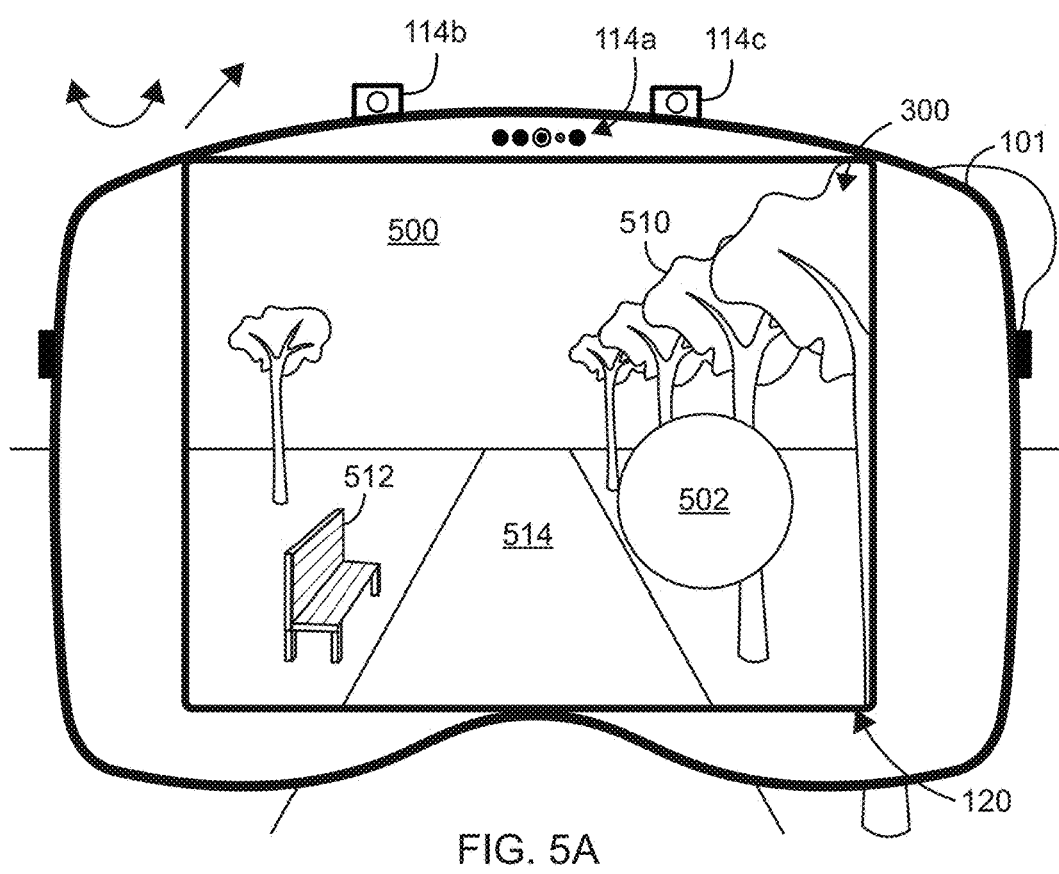
FIGS. 5A-5B illustrate examples of an electronic device applying a second correction factor to motion of a virtual object while the electronic device moves with a second movement pattern according to examples of the disclosure.
Figure 5B:
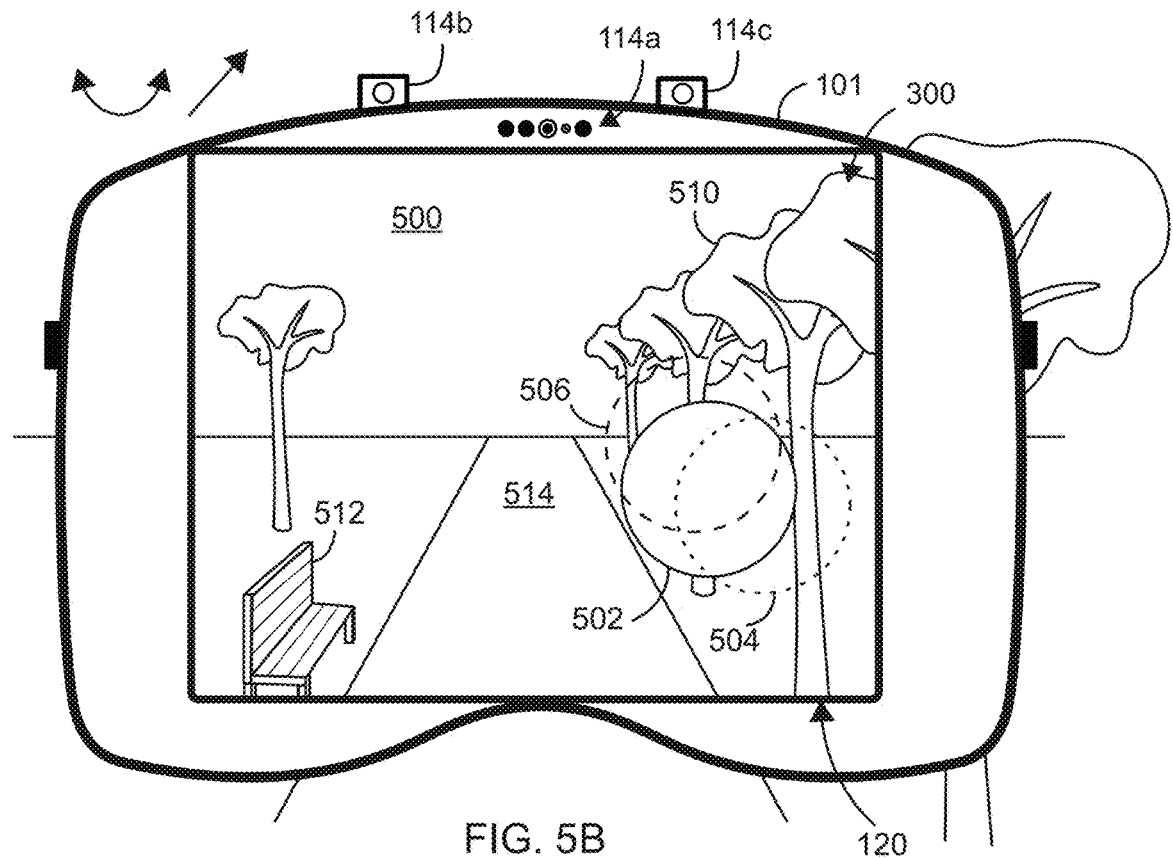

FIGS. 5A-5B illustrate examples of an electronic device 101 applying a second correction factor to motion of a virtual object 502 while the electronic device 101 moves with a second movement pattern according to examples of the disclosure. In some examples, second movement pattern can correspond to the user running, whereas the first movement pattern described above can correspond to the user walking. In some examples, the second movement pattern can correspond to the user sprinting, whereas the first movement pattern described above can correspond to the user jogging or running. Other movement patterns are possible without departing from the scope of the disclosure.

In some examples, the electronic device 101 uses one or more second criteria to identify the second movement pattern. In some examples, the one or more second criteria can be different from the one or more first criteria. For example, the one or more second criteria include a criterion that is satisfied when the electronic device 101 detects periodic and/or repeating motion up and down by a threshold amount (e.g., distance, speed and/or frequency) and periodic and/or repeating motion side to side by another threshold amount (e.g., distance, speed, and/or frequency) corresponding to the user's steps while moving according to the second movement pattern (e.g., running or sprinting according to the second movement pattern). As another example, the one or more second criteria include a criterion that is satisfied when the electronic device 101 detects motion of the electronic device 101 in the direction of travel in which the user is moving, such as forward motion as the user runs or sprints in the second movement pattern.

FIG. 5A illustrates an example of the electronic device 101 presenting a three-dimensional environment 500 including representations 510, 512, and 514 of real objects in the physical environment of the electronic device 101 and virtual object 502. For example, the three-dimensional environment 500 includes a representation 510 of a tree, a representation 512 of a bench, and a representation 514 of a path. In some examples, the electronic device 101 uses optical see-through or video passthrough techniques described herein to present the representations 510 through 514 of real objects. In some examples, virtual object 502 is a user interface element, a content item, or another virtual object that the electronic device 101 displays using the display. In some examples, the electronic device 101 displays the virtual object 502 to simulate the virtual object 502 following the user as the viewpoint of the user moves through the three-dimensional environment 500. As described herein, in some examples, the electronic device 101 applies the second correction factor corresponding to the second movement pattern of the electronic device 101 when moving the virtual object 502 in the three-dimensional environment 500. For example, as shown in FIG. 5A, the electronic device 101 detects motion of the electronic device 101 in a direction of travel and motion of the electronic device 101 up and down and/or side to side corresponding to the second movement pattern (e.g., running or sprinting). In some examples, the second correction factor applies to the delay in motion of virtual object 502 in response to the up and down motion of the electronic device 101 and to the side-to-side motion of the electronic device 101, but optionally not to the motion of the electronic device 101 in the direction of travel. As described in more detail below, in some examples, applying the second correction factor the movement of the virtual object 502 can include applying different amounts of dampening to the up and down motion and to the side-to-side motion. For example, the amount of dampening applied to the up and down motion can be greater than the amount of dampening applied to the side-to-side motion.

FIG. 5B illustrates an example of the electronic device 101 applying the second correction factor to the movement of virtual object 502 in accordance with the second movement pattern of the electronic device 101. In FIG. 5B, for example, the user has run along the path in a direction of travel from the location of the electronic device 101 in FIG. 5A and, while the user is running, the electronic device 101 has moved up vertically to the left in accordance with the user's steps. As shown in FIG. 5B, the presentation of representations 510 through 514 may be updated in accordance with the updated position of the electronic device 101 in the physical environment, for example. As also shown in the example of FIG. 5B, the electronic device 101 updates the position of virtual object 502 in the direction of travel of the electronic device 101 to simulate the virtual object 502 following the user and to maintain display of the virtual object 502 as the electronic device 101 moves in the physical environment.

In some examples, the electronic device 101 applies the second correction factor to the up and down and/or side to side motion of virtual object 502 while the electronic device 101 is moving with the second movement pattern. For example, the electronic device 101 displays the virtual object 502 at the location shown in FIG. 5B because the electronic device 101 moves the virtual object 502 up and down and/or side to side with a speed and/or distance that is greater than zero but less than the speed and/or distance of the up and down and/or side to side movement of the viewpoint of the user relative to the physical environment. To illustrate this concept, FIG. 5B includes indications of locations 504 and 506, which will now be described. For example, location 504 is the location at which the electronic device 101 would display the virtual object 502 if the height and/or lateral position of the object was fixed in the three-dimensional environment 500 (e.g., corresponding to no movement, or to infinite dampening) instead of moving with the second correction factor. For example, location 506 is the location at which the electronic device 101 would display the virtual object 502 if the electronic device 101 moved the virtual object up and down and/or side to side with the same motion as the up and down and/or side to side movement of the electronic device 101 (e.g., no dampening) instead of moving with the second correction factor. In some examples, in FIG. 5B, the electronic device 101 displays virtual object 502 between locations 504 and 506 because the electronic device 101 applies the second correction factor to the up and down and side to side motion of the virtual object 502. For example, the electronic device 101 displays the virtual object 502 at a location that is a linear interpolation between location 504 (e.g., corresponding to no movement or to infinite dampening) and location 506 (e.g., corresponding to no dampening). As shown in FIG. 5B, applying the second correction factor can include applying more dampening to the up and down motion of virtual object 502 than the dampening applied to the side-to-side motion of virtual object 502. For example, the location of virtual object 502 in FIG. 5B has a vertical position that is closer to the vertical position of location 504 (representing fixed position, or infinite dampening) than it is to the vertical position of location 506 (representing no dampening). As another example, the location of virtual object 502 in FIG. 5B has a horizontal position that is closer to the horizontal position of location 506 (representing no dampening) than it is to the horizontal position of location 504 (representing fixed position, or infinite dampening). In some examples, the electronic device 101 does not display indications of locations 504 and 506; these indications are included in FIG. 5B for the purpose of illustration and explanation. In some examples, the electronic device 101 applies dampening and/or linear interpolation to the (e.g., position, speed, and/or acceleration) of the motion of the virtual object 502 in the direction of travel of the electronic device 101 that is different from the second correction factor applied to the up and down and/or side to side motion of the second movement pattern. For example, the second correction factor includes applying more dampening to the up and down motion and/or to the side-to-side motion than the amount of dampening applied to motion in the direction of travel.

In some examples, the second correction factor can be different from the first correction factor. For example, the second correction factor can apply to motion in more directions/dimensions than the first correction factor. For example, the second correction factor can apply to up and down motion and side to side motion and the first correction factor can apply to up and down motion without applying to side-to-side motion. Additionally or alternatively, in some examples, the amount of dampening and/or linear interpolation of the first correction factor can be different from the second correction factor. For example, the amount of dampening in the up and down direction can be different between the first correction factor and the second correction factor. In some examples, in response to detecting the first or second movement pattern based on the one or more first or second criteria, the electronic device 101 can make additional or alternative modifications to virtual objects, as will be described below with reference to FIGS. 7A-8C. In some examples, these modifications can differ depending on whether the electronic device 101 detects the first movement pattern based on the one or more first criteria or the second movement pattern based on the one or more second criteria.

Figure 6A:
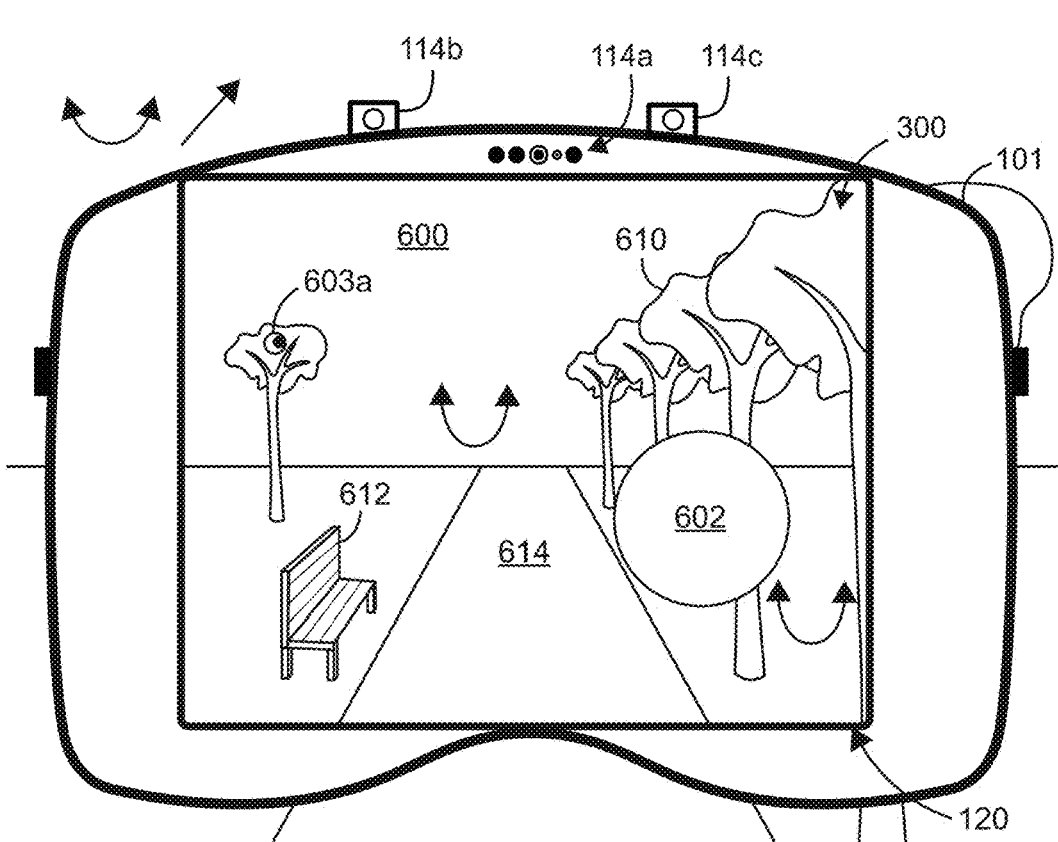
FIGS. 6A-6B illustrate examples of the electronic device modifying movement of a virtual object while the electronic device is moving in accordance with a location of gaze of the user of the electronic device according to some examples of the disclosure.
Figure 6B:
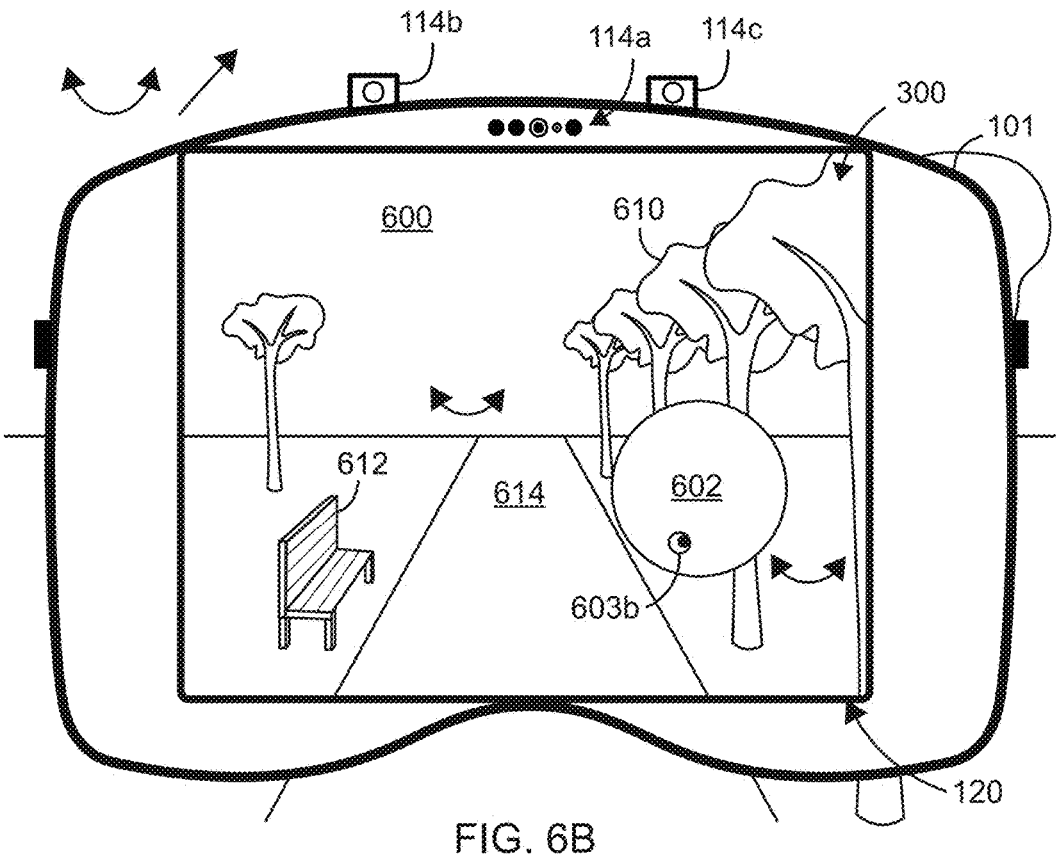

FIGS. 6A-6B illustrate examples of the electronic device 101 modifying movement of a virtual object while the electronic device 101 is moving in accordance with a location of gaze of the user of the electronic device 101 according to some examples of the disclosure. In some examples, the electronic device 101 can adjust the amount of correction applied to the motion of a virtual object depending on whether or not the user's gaze is directed to the virtual object, such as applying the first or second correction factor when the user's gaze is directed to the virtual object (e.g., for a threshold time of 0.1, 0.3, 0.5, 1, 2, or 3 seconds or for any amount of time) and reducing or forgoing the first or second correction factor when the user's gaze is directed away from the virtual object (e.g., for the threshold time or for any amount of time).

In FIG. 6A, the electronic device 101 can present a three-dimensional environment 600 including a representation 610 of a real tree, a representation 612 of a real bench, and a representation 614 of a real path and a virtual object 602. For example, in FIG. 6A, the user is using the electronic device 101 while moving according to the second movement pattern (e.g., running or sprinting). In some examples, the electronic device 101 detects the second movement pattern using the one or more second criteria described in more detail above with reference to FIGS. 5A-5B. For example, while the user is moving according to the second movement pattern, the electronic device 101 moves up and down and/or side to side in accordance with the user's steps.

In some examples, while the user is moving according to the second movement pattern, the electronic device 101 presents the representations 610 through 614 of real objects in the three-dimensional environment 600 including movement of the representations 610 through 614 in accordance with movement of the electronic device 101 As described above, for example, the user may not perceive the representations 610 through 614 of real objects as moving due to the user's perception of themself as moving through the environment.

As shown in FIG. 6A, for example, the gaze 603a of the user is not directed to the virtual object 602. Instead, for example, the gaze 603a of the user is directed to a tree in the three-dimensional environment. In some examples, while the gaze 603a of the user is directed away from the virtual object 602, the electronic device 101 ceases applying the second correction factor to the motion of the virtual object 602 or reduces the second correction factor. For example, as shown in FIG. 6A, the virtual object 602 moves up and down and side to side in the three-dimensional environment 600 in accordance with the user's steps by an amount greater than would be the case if the gaze of the user were directed to the virtual object 602. In some examples, reducing the application of the second correction factor includes moving the virtual object 602 up and down and/or side to side with the less delay and/or dampening as the delay and/or dampening of the second correction factor. In some examples, reducing the application of the second correction factor includes moving the virtual object 602 in accordance with movement of the representations 610 through 614 of real objects in the three-dimensional environment. In some examples, reducing the application of the second correction factor includes moving the virtual object 602 up and down and/or side to side with the same delay and/or dampening as the delay and/or dampening with which the electronic device 101 moves the virtual object 602 in the direction of travel of the electronic device 101. In some examples, the electronic device 101 does not apply the second correction factor to the motion of virtual object 602 while the user is not looking at the virtual object. In some examples, the degree to which the electronic device 101 reduces the second correction factor varies between the application of the second factor to up and down motion of the virtual object and the application of the second correction factor to side-to-side motion of the virtual object 602. For example, the electronic device 101 reduces the application of the second correction factor to up and down motion more than the application of the second correction factor to side-to-side motion. As another example, the electronic device 101 reduces the application of the second correction factor to side-to-side motion more than the application of the second correction factor to up and down motion.

In FIG. 6B, for example, the gaze 603b of the user is directed to the virtual object 602. In some examples, in FIG.

6B, the electronic device 101 presents the representations 610 through 614 of real objects in the same manner as the manner described above with reference to FIG. 6A, presenting movement of the representations 610 through 614 up and down and side to side in accordance with the movement of the electronic device 101 up and down and side to side caused by the user's steps. As shown in FIG. 6B, while the gaze 603b is directed to virtual object 602, the electronic device 101 applies the second correction factor to the up and down and side to side movement of the virtual object 602, thereby reducing the amount of movement in these directions of the virtual object 602. Thus, in some examples, the electronic device 101 selectively applies the second correction factor to the movement of the virtual object 602 in response to detecting the gaze 603b of the user directed to the virtual object 602 and reduces or omits the second correction factor in response to detecting the gaze of the user directed away from the virtual object 602.

Although the examples in FIGS. 6A and 6B have been described with reference to the second movement pattern and the application of the second correction factor, this description is not intended to be limiting. In some examples, the electronic device 101 applies these techniques to the first correction factor in accordance with detecting movement of the electronic device 101 according to the first movement pattern. For example, while detecting movement of the electronic device 101 according to the first movement pattern, in response to detecting the gaze of the user directed to the virtual object, the electronic device 101 applies the first correction factor the movement of the virtual object 602. For example, the electronic device 101 dampens the motion of the virtual object 602 up and down in accordance with the user's steps. In some examples, while detecting movement of the electronic device 101 according to the first movement pattern, in response to detecting the gaze of the user directed away from the virtual object 602, the electronic device 101 reduces the first correction factor or omits applying the first correction factor to the movement of the virtual object 602 in a manner similar to the manner of selectively reducing the application of the second correction factor described above.

Figure 7A:
FIGS. 7A-7C illustrate examples of the electronic device modifying the contents of a virtual object depending on the movement pattern of the electronic device according to some examples of the disclosure.
Figure 7A:
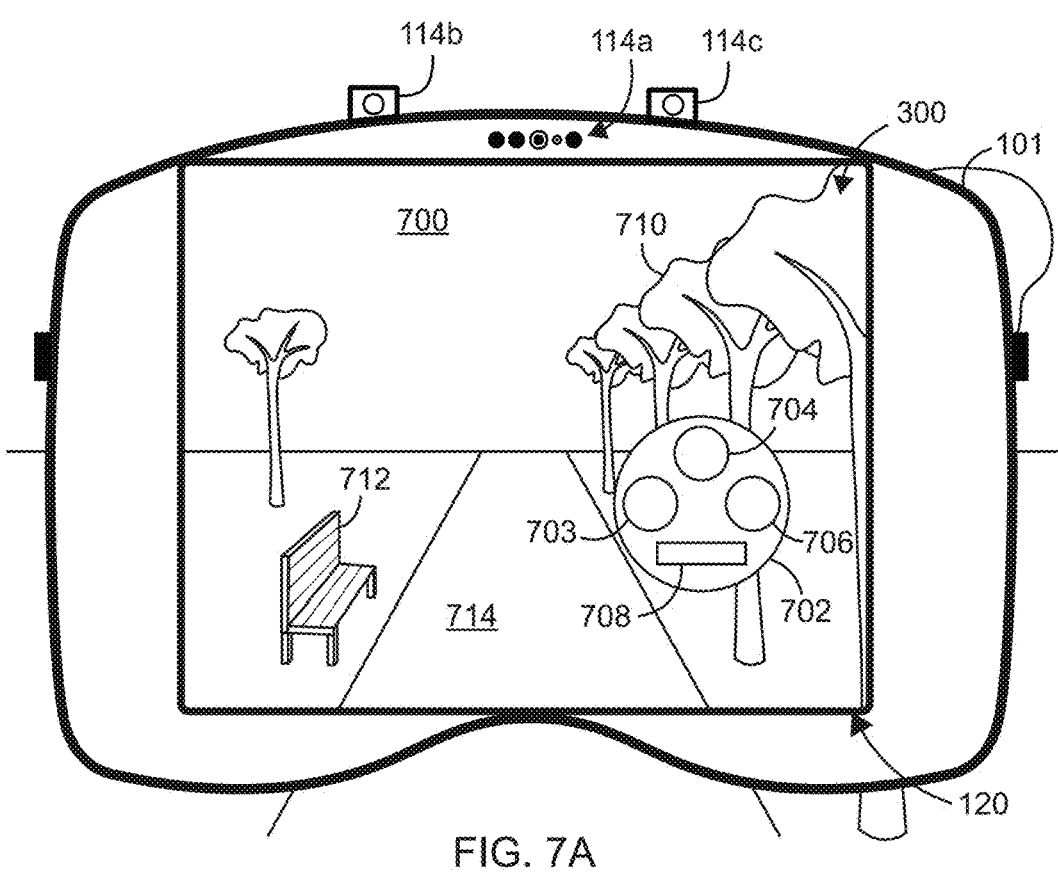
Figure 7B:
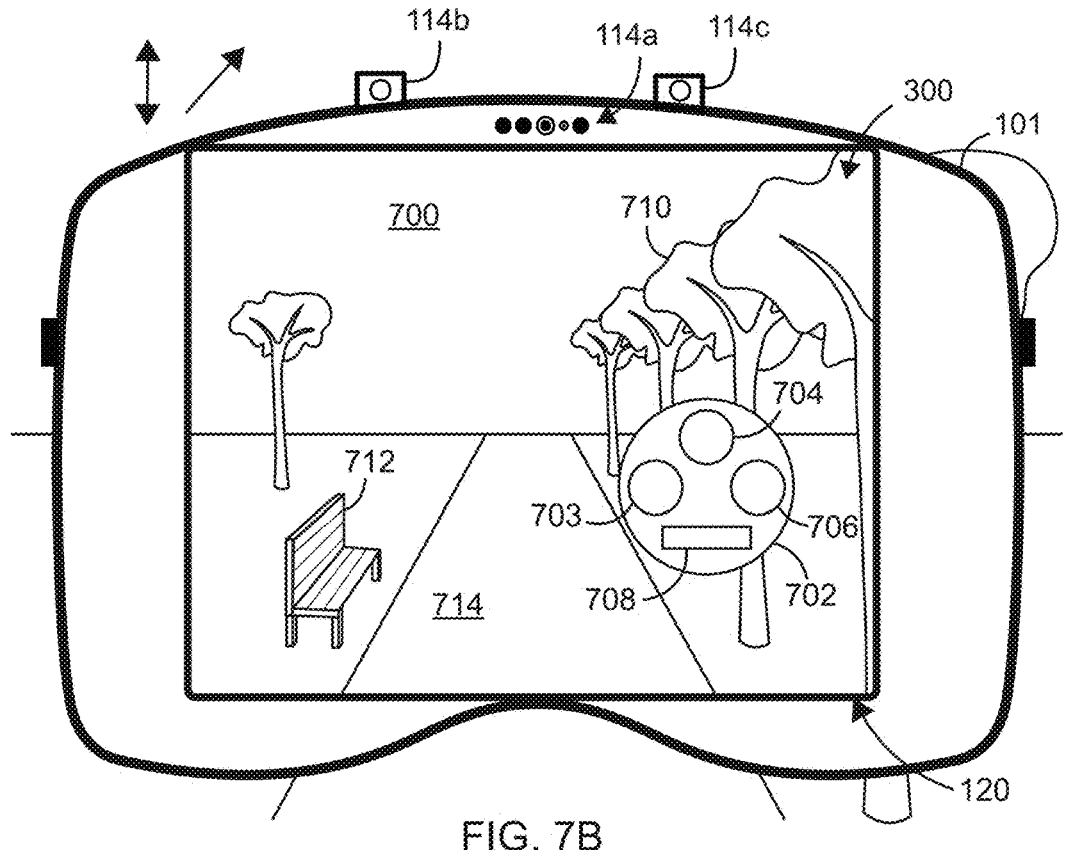
Figure 7C:
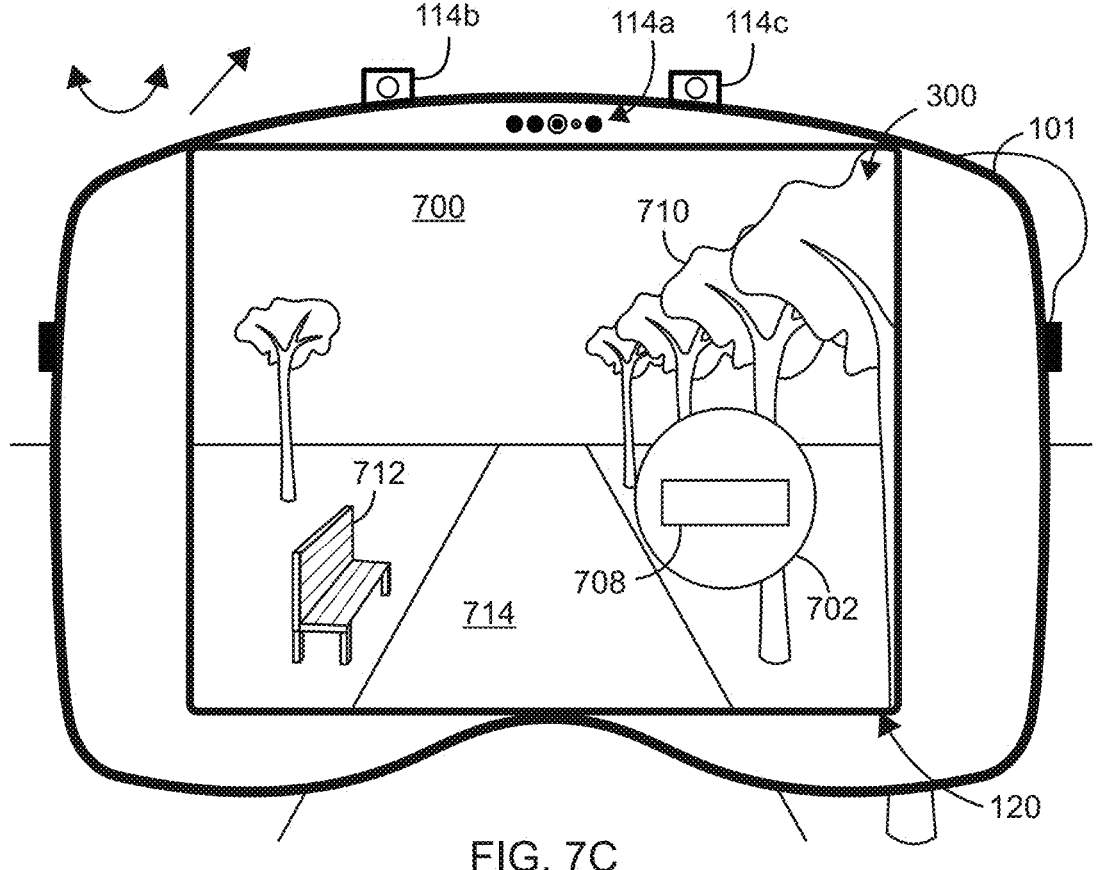

FIGS. 7A-7C illustrate examples of the electronic device 101 modifying the contents of a virtual object 702 depending on the movement pattern of the electronic device 101 according to some examples of the disclosure. In some examples, the virtual object 702 can include one or more user interface elements and/or content items and, in response to detecting movement of the electronic device 101 according to the second or a different movement pattern, the electronic device 101 can reduce the number of user interface elements included in the virtual object 702.

FIG. 7A illustrates an example of the electronic device 101 displaying virtual object 702 in three-dimensional environment 700. For example, the three-dimensional environment 700 includes a representation 710 of a real tree, a representation 712 of a real bench, and a representation 714 of a real path. In FIG. 7A, for example, the electronic device 101 can detect that the electronic device 101 is not moving or is moving by less than a threshold amount (e.g., of distance, duration, and/or speed). In some examples, while the electronic device 101 is not moving, or is moving by less than a threshold amount, the electronic device 101 can display the virtual object 702 with user interface elements 703, 704, 706, and 708. Additionally or alternatively, in some examples, the electronic device 101 can display the virtual object 702 with the user interface elements 703 through 708 while electronic device 101 is moving in a manner other the first movement pattern or the second movement pattern. For example, movement other than the first or second movement pattern can include movement corresponding to the user turning or rotating their head, torso, and/or body or the user moving in a vehicle (e.g., as a passenger). In some examples, virtual object 702 can be a user interface of an application of the electronic device 101 and user interface elements 703 through 708 can include selectable options, visual indications, content, and other interactive and/or not interactive elements.

FIG. 7B illustrates an example of the electronic device 101 displaying virtual object 702 in three-dimensional environment 700. In FIG. 7B, the electronic device 101 detects that the electronic device 101 is moving according to the first movement pattern. For example, the electronic device 101 detects that the electronic device 101 is moving up and down in accordance with the user's steps in the first movement pattern (e.g., walking, jogging, or running). In some examples, when the electronic device 101 detects movement in the first movement pattern, the electronic device 101 maintains display of the virtual object 702 including user interface elements 703 through 708 described in more detail above. In some examples, while detecting movement of the first electronic device 101 in the first movement pattern in FIG. 7B, the electronic device 101 updates the position of virtual object 702 in accordance with the movement of the electronic device 101 including applying the first correction factor as described herein.

FIG. 7C illustrates an example of the electronic device 101 displaying virtual object 702 in three-dimensional environment 700. In FIG. 7C, the electronic device 101 detects that the electronic device 101 is moving according to the second movement pattern. For example, the electronic device 101 detects that the electronic device 101 is moving up and down and/or side to side in accordance with the user's steps in the second movement pattern (e.g., running or sprinting). In some examples, when the electronic device 101 detects movement in the second movement pattern, the electronic device 101 reduces the number of user interface elements included in the virtual object 702. For example, in FIG. 7C, the virtual object 702 includes user interface element 708, but does not include user interface element 703-706 shown in FIGS. 7A-7B. In some examples, the electronic device 101 increases the size of user interface element 708 in FIG. 7C in response to detecting movement in the second movement pattern, compared to the size of user interface element 708 in FIGS. 7A-7B when the electronic device 101 did not detect the second movement pattern. In some examples, the electronic device 101 modifies the position of user interface element 708 within virtual object 702 in FIG. 7C in response to detecting movement in the second movement pattern, compared to the position of user interface element 708 in FIGS. 7A-7B when the electronic device 101 did not detect the second movement pattern. In some examples, while detecting movement of the first electronic device 101 in the second movement pattern in FIG. 7C, the electronic device 101 updates the position of virtual object 702 in accordance with the movement of the electronic device 101 including applying the second correction factor as described herein.

Figure 8A:
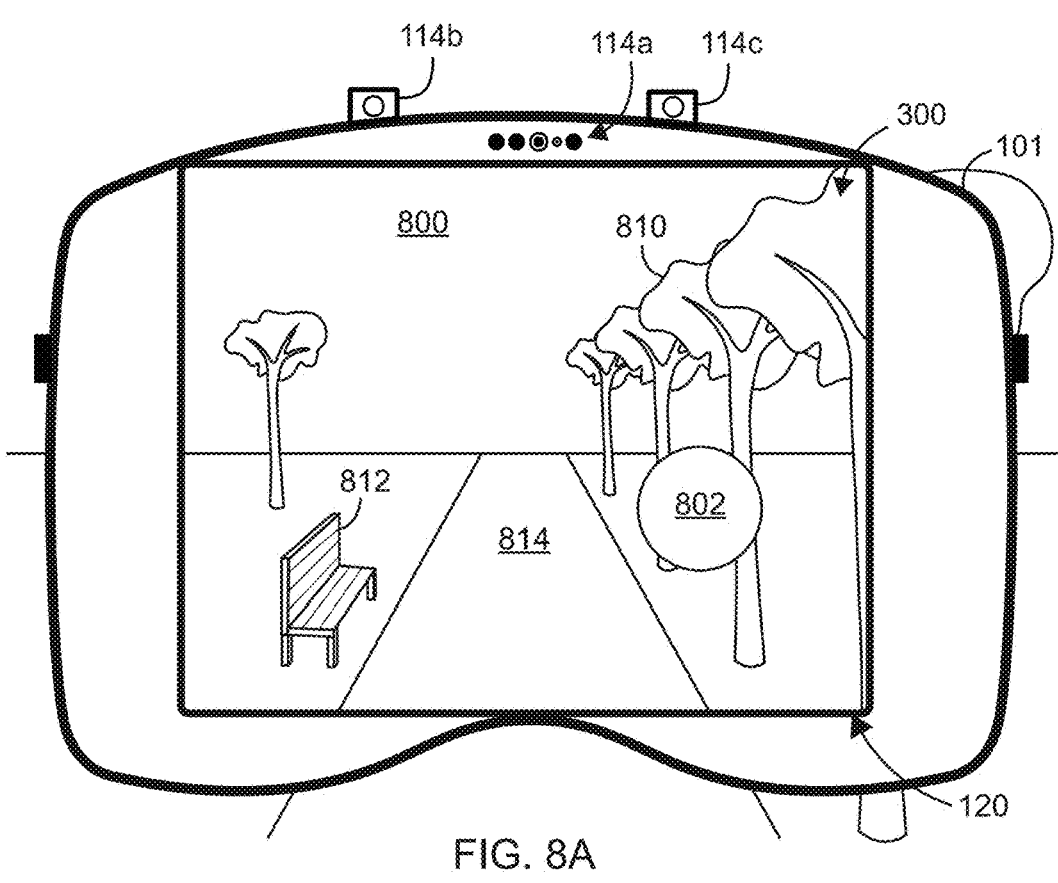
FIGS. 8A-8C illustrate examples of the electronic device modifying the size of a virtual object depending on the movement pattern of the electronic device according to some examples of the disclosure.
Figure 8B:
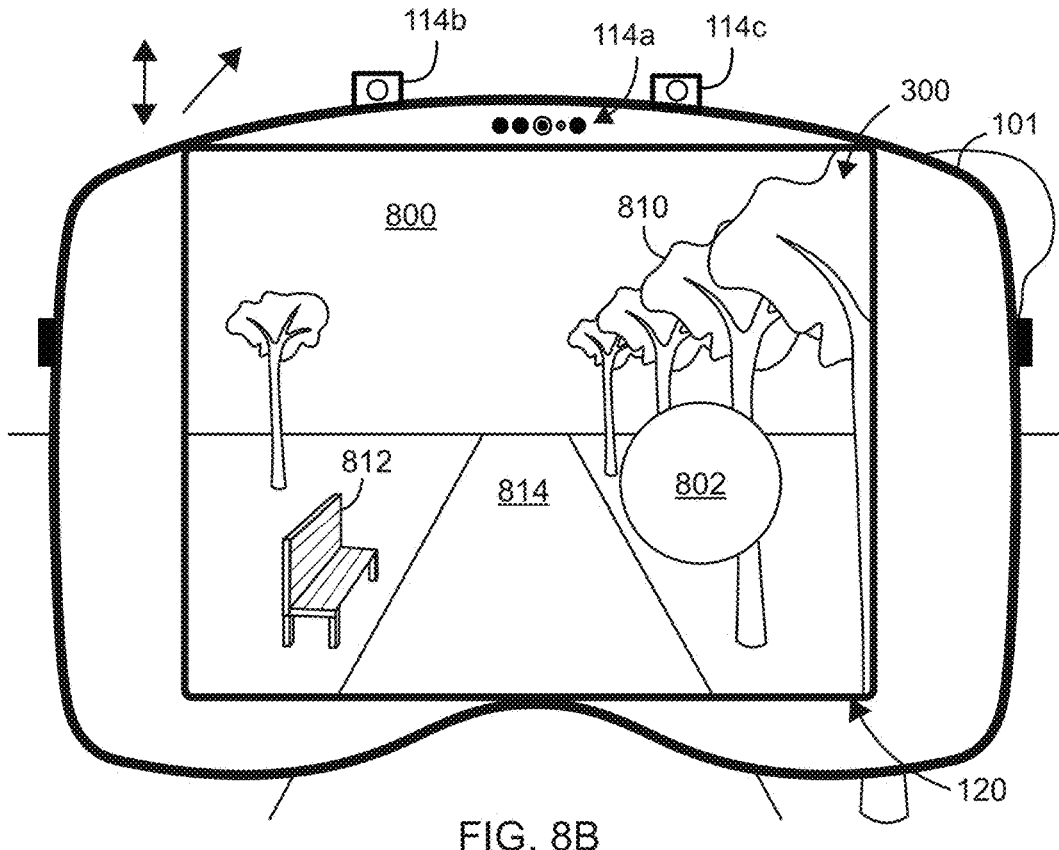
Figure 8C:
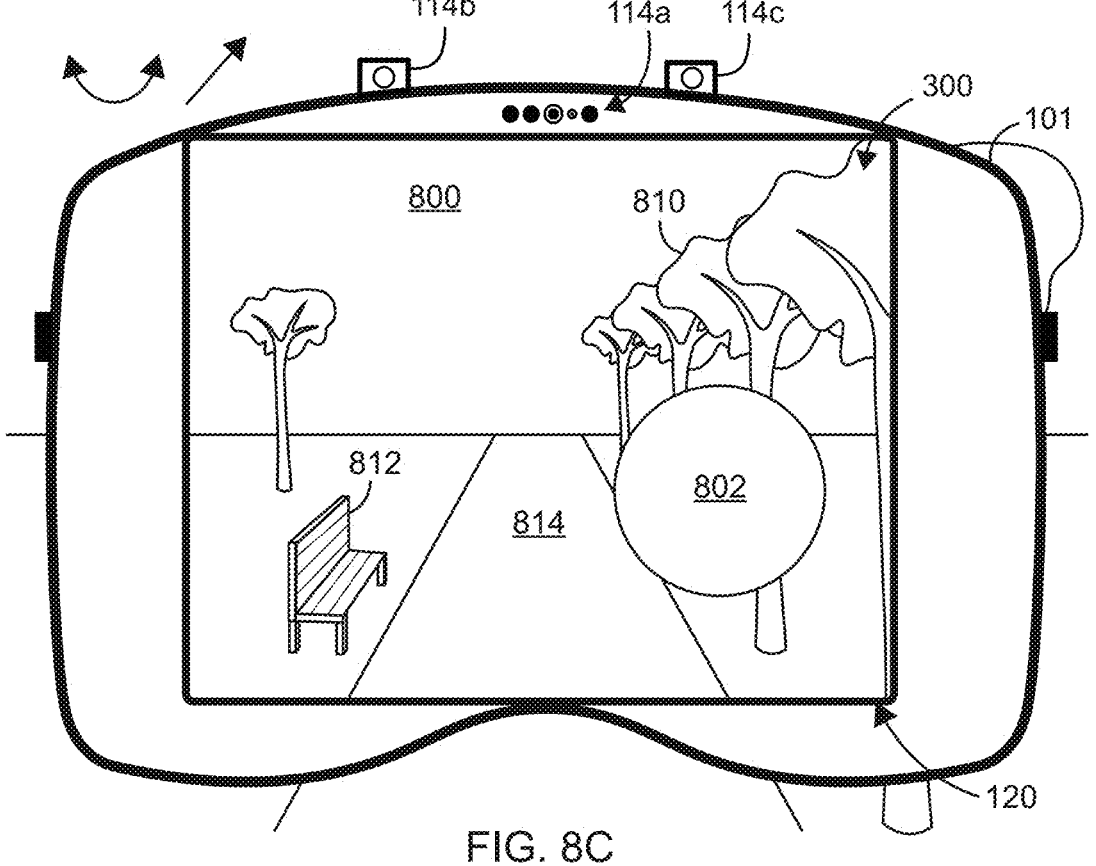

FIGS. 8A-8C illustrate examples of the electronic device 101 modifying the size of a virtual object 802 depending on the movement pattern of the electronic device 101 according to some examples of the disclosure. In FIG. 8A, the electronic device 101 can present a three-dimensional environment 800 while the electronic device 101 detects that the electronic device 101 is not moving or is moving by less than a threshold amount (e.g., speed, distance, and/or duration). In some examples, the three-dimensional environment 800 includes a representation 810 of a real tree, a representation 812 of a real bench, and a representation 814 of a real path. As shown in FIG. 8A, the electronic device 101 displays the virtual object 802 at a first size while the electronic device 101 is not moving or is moving by less than a threshold amount. In some examples, in response to detecting movement of the first electronic device 101 that does not correspond to the first movement pattern or the second movement pattern, such as the examples described above, the electronic device 101 displays the virtual object 802 at the first size.

In FIG. 8B, the electronic device 101 can detect that the electronic device 101 is moving according to the first movement pattern. For example, the electronic device 101 can detect movement up and down in accordance with steps of the user and/or movement in a direction of travel. In some examples, while detecting movement corresponding to the first movement pattern, the electronic device 101 can display the virtual object 802 with the first correction factor as described herein. Additionally or alternatively, in some examples, while detecting movement corresponding to the first movement pattern, the electronic device 101 can display the virtual object 802 at a size larger than the size of the virtual object 802 in FIG. 8A when the electronic device 101 did not detect movement corresponding to the first movement pattern or the second movement pattern. In some examples, increasing the size of the virtual object 802 includes increasing the size(s) of one or more user interface elements included in the virtual object 802. Additionally or alternatively, in some examples, increasing the size of the virtual object 802 includes modifying the padding between one or more user interface elements included in the virtual object 802. In some examples, the electronic device 101 displays virtual object 802 at the same size when the electronic device 101 detects the first movement pattern as the size when the electronic device 101 did not detect the first or second movement pattern, such as in FIG. 8A.

In FIG. 8C, the electronic device 101 can detect that the electronic device 101 is moving according to the second movement pattern. For example, the electronic device 101 can detect movement up and down and/or side to side in accordance with steps of the user and/or movement in a direction of travel. In some examples, while detecting movement corresponding to the second movement pattern, the electronic device 101 can display the virtual object 802 with the second correction factor as described herein. Additionally or alternatively, in some examples, while detecting movement corresponding to the second movement pattern, the electronic device 101 can display the virtual object 802 at a size larger than the size of the virtual object 802 in FIG. 8B when the electronic device 101 detected movement corresponding to the first movement pattern. In some examples, increasing the size of the virtual object 802 includes increasing the size(s) of one or more user interface elements included in the virtual object 802. Additionally or alternatively, in some examples, increasing the size of the virtual object 802 modifying the padding between one or more user interface elements included in the virtual object 802.

Additionally or alternatively, in some examples, the electronic device 101 limits the interactivity of virtual objects in accordance with detected movement patterns. For example, one or more virtual objects can be interactive (e.g., using gaze as input); in response to receiving an input directed to the virtual object, the electronic device 101 can perform an associated action. In some examples, in response to detecting the input while the electronic device does not detect movement in the first or second movement pattern, the electronic device 101 performs the action associated with the virtual object. In some examples, in response to detecting the input directed to the virtual object while detecting the first movement pattern (e.g., corresponding to walking, jogging, or running) or the second movement pattern (e.g., corresponding to running or sprinting), the electronic device forgoes performing the associated action. In some examples, the electronic device 101 performs the action in response to receiving the input while detecting the first movement pattern but forgoes the action in response to receiving the input while detecting the second movement pattern.

FIG. 9 illustrates an example method 900 of modifying movement of a virtual object displayed in a three-dimensional environment in accordance with a movement pattern of the electronic device 101 according to some examples of the disclosure. In some examples, electronic device 101 performs method 900 in accordance with one or more of the techniques described above with reference to FIGS. 3A-8C.

In some examples, method 900 can include presenting (902), using the display, a computer-generated environment including a representation of a physical environment of the electronic device form a viewpoint of a user of the electronic device (904). For example, in FIG. 3A, the electronic device 101 presents three-dimensional environment 300 including representations 310 through 314 of real objects in the physical environment of the electronic device 101.

In some examples, method 900 can include presenting (902), using the display, at a respective location relative to the viewpoint of the user, a user interface element. For example, in FIG. 3A, the electronic device 101 presents virtual object 302.

In some examples, method 900 can include, while presenting the computer-generated environment, detecting (908) movement of the electronic device 101 relative to the physical environment. For example, detecting movement of the electronic device 101 can include detecting the movement of the electronic device according to the first movement pattern as shown at least in FIGS. 4A-4B. As another example, detecting movement of the electronic device 101 can include detecting the movement of the electronic device according to the second movement pattern as shown at least in FIGS. 5A-5B.

In some examples, method 900 can include, in response to detecting the movement of the electronic device 101 (910), updating display of the user interface element relative to the physical environment in accordance with the movement of the election device (912) including, in accordance with a determination that the movement of the electronic device 101 satisfies one or more first criteria, moving (914) the user interface element relative to the viewpoint of the user with a first correction factor. For example, in FIGS. 4A-4B, the electronic device 101 detects movement according to the first movement pattern based on the one or more first criteria and, in response, moves virtual object 402 according to the first correction factor.

In some examples, method 900 can include, in response to detecting the movement of the electronic device 101 (910), updating display of the user interface element relative to the physical environment in accordance with the movement of the election device (912) including, in accordance with a determination that the movement of the electronic device 101 satisfies one or more second criteria different from the one or more first criteria, moving (916) the user interface element relative to the viewpoint of the user with a second correction factor. For example, in FIGS. 5A-5B, the electronic device 101 detects movement according to the second movement pattern based on the one or more second criteria and, in response, moves virtual object 502 according to the second correction factor.

It is understood that method 900 is an example and that more, fewer, or different operations can be performed in the same or in a different order. Additionally, the operations in method 900 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method, comprising, at an electronic device in communication with a display and one or more input devices of the electronic device, presenting, using the display a view of a three-dimensional environment based on a physical environment of the electronic device from a viewpoint of a user of the electronic device, and at a respective location relative to the viewpoint of the user, a user interface element; while presenting the view of the three-dimensional environment, detecting movement of the electronic device relative to the physical environment; and in response to detecting the movement of the electronic device: updating presentation of the user interface element in accordance with the movement of the electronic device including: moving the user interface element relative to the three-dimensional environment in accordance with the movement of the electronic device; in accordance with a determination that one or more first criteria are satisfied, including a first criterion that is satisfied based on the movement of the electronic device, moving the user interface element relative to the viewpoint of the user in accordance with the movement of the electronic device with a first correction factor; and in accordance with a determination that one or more second criteria are satisfied, including a second criterion that is satisfied based on the movement of the electronic device, moving the user interface element relative to the viewpoint of the user in accordance with the movement of the electronic device with a second correction factor different from the first correction factor. Additionally or alternatively, in some examples the one or more first criteria and the one or more second criteria include a criterion that is satisfied when a gaze of the user of the electronic device is directed to the user interface element and the method further comprises, in response to detecting the movement of the electronic device, in accordance with a determination that the gaze of the user is not directed to the user interface element, moving the user interface element relative to the viewpoint of the user with a third correction factor that is less than the first correction factor and less than the second correction factor. Additionally or alternatively, in some examples moving the user interface element relative to the physical environment in accordance with the movement of the electronic device includes moving the user interface element in a first direction with an acceleration less than an acceleration of at least a portion of the movement of the electronic device in the first direction. Additionally or alternatively, in some examples moving the user interface element relative to the physical environment in accordance with the movement of the electronic device includes moving the user interface element in a first direction with a speed the same as that of at least a portion of the movement of the electronic device in the first direction. Additionally or alternatively, in some examples the first criterion and the second criterion are satisfied when the movement of the electronic device includes periodic movement in a first dimension relative to the physical environment by a first amount and a second amount, respectively, and movement in a second dimension relative to the physical environment, moving the user interface element relative to the viewpoint of the user in accordance with the movement of the electronic device with the first correction factor includes moving the user interface element relative to the viewpoint of the user in the first dimension corresponding to the periodic movement of the electronic device in the first dimension by a magnitude greater than a magnitude of moving the user interface element relative to the viewpoint of the user in the second dimension, and moving the user interface element relative to the viewpoint of the user with the second correction factor includes moving the user interface element relative to the viewpoint of the user in the first dimension corresponding to the periodic movement of the electronic device in the first dimension by a magnitude greater than a magnitude of moving the user interface element relative to the viewpoint of the user in the second dimension. Additionally or alternatively, in some examples the first criterion is satisfied when the movement of the electronic device includes periodic movement in a respective dimension with a magnitude greater than a predefined threshold, moving the user interface element relative to the viewpoint of the user in accordance with the movement of the electronic device with the first correction factor comprises moving the user interface element relative to the viewpoint of the user in the respective dimension in accordance with the periodic movement of the electronic device in the respective dimension, the second criterion is satisfied when the movement of the electronic device does not include the periodic movement in the respective dimension with the magnitude greater than the predefined threshold, moving the user interface element relative to the viewpoint of the user in accordance with the movement of the electronic device with the second correction factor does not include moving the user interface element relative to the viewpoint of the user in the respective dimension in accordance with the periodic movement of the electronic device in the respective dimension. Additionally or alternatively, in some examples updating presentation of the user interface element in accordance with the movement of the electronic device further includes: in accordance with the determination that the one or more first criteria are satisfied, presenting the user interface element with a first amount of information, and in accordance with the determination that the one or more second criteria are satisfied, presenting the user interface element with a second amount of information that is greater than the first amount of information. Additionally or alternatively, in some examples updating display of the user interface element in accordance with the movement of the electronic device further includes: in accordance with the determination that the one or more first criteria are satisfied, presenting the user interface element at a first size, and in accordance with the determination that the one or more second criteria are satisfied, presenting the user interface element at a second size less than the first size. Additionally or alternatively, in some examples updating the display of the user interface element in accordance with the movement of the electronic device further includes: in accordance with a determination that a portion of the movement of the electronic device relative to the physical environment is caused by movement of a vehicle moving the electronic device: moving the user interface element relative to the physical environment in accordance with the portion of the movement of the electronic device relative to the physical environment caused by the movement of the vehicle, in accordance with the determination that the one or more first criteria are satisfied, moving the user interface element relative to the viewpoint of the user with the first correction factor irrespective of the portion of the movement of the electronic device relative to the physical environment caused by the movement of the vehicle; and in accordance with the determination that the one or more second criteria are satisfied, moving the user interface element relative to the viewpoint of the user with the second correction factor irrespective of the portion of the movement of the electronic device relative to the physical environment caused by the movement of the vehicle. Additionally or alternatively, in some examples moving the user interface element relative to the viewpoint of the user in accordance with the movement of the electronic device with the first correction factor includes: moving the user interface element relative to the viewpoint of the user in a first dimension with a first amount of interpolation relative to movement of the electronic device in the first dimension, and moving the user interface element relative to the viewpoint of the user in a second dimension different from the first dimension with a second amount of interpolation relative to movement of the electronic device in the second dimension different from the first amount, and moving the user interface element relative to the viewpoint of the user in accordance with the movement of the electronic device with the second correction factor includes: moving the user interface element relative to the viewpoint of the user in the first dimension with a third amount of interpolation relative to movement of the electronic device in the first dimension, and moving the user interface element relative to the viewpoint of the user in the second dimension with a fourth amount of interpolation relative to movement of the electronic device in the second dimension different from the third amount. Additionally or alternatively, in some examples the first dimension is a direction of gravity, the first amount is less than the second amount, and the third amount is less than the fourth amount. Additionally or alternatively, some examples include, while presenting the user interface element, receiving, via the one or more input devices, an input (e.g., gaze) directed to the user interface element; and in response to receiving the input directed to the user interface element: in accordance with a determination that one or more third criteria are satisfied, performing an operation in accordance with the user interface element; and in accordance with a determination that the one or more third criteria are not satisfied, forgoing performing the operation in accordance with the user interface element. Additionally or alternatively, in some examples the one or more third criteria are satisfied when the electronic device does not detect movement over a threshold amount. Additionally or alternatively, in some examples the one or more third criteria are satisfied in accordance with the one or more first criteria being satisfied and the one or more third criteria are not satisfied in accordance with the one or more second criteria being satisfied. Additionally or alternatively, in some examples the one or more third criteria are not satisfied in accordance with the one or more first criteria being satisfied or the one or more second criteria being satisfied.

Some examples are directed to an electronic device comprising: one or more processors; memory; and one or more programs stored in the memory and configured to be executed by the one or more processors, the one or more programs including instructions for performing one or more of the methods described herein. Some examples are directed to a non-transitory computer readable storage medium storing one or more programs, the one or more programs comprising instructions, which when executed by one or more processors of an electronic device, cause the electronic device to perform one or more of the methods described herein. Some examples are directed to an electronic device, comprising: one or more processors; memory; and means for performing one or more of the methods described herein. Some examples are directed to an information processing apparatus for use in an electronic device, the information processing apparatus comprising means for performing one or more of the methods described herein.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

The invention claimed is:

1. A method comprising:

at an electronic device in communication with a display and one or more input devices of the electronic device:
    presenting, using the display:
        a view of a three-dimensional environment based on a physical environment of the electronic device from a viewpoint of a user of the electronic device, and
        at a respective location relative to the viewpoint of the user, a user interface element;
    while presenting the view of the three-dimensional environment, detecting movement of the electronic device relative to the physical environment; and
    in response to detecting the movement of the electronic device:
        updating presentation of the user interface element in accordance with the movement of the electronic device including:
        moving the user interface element relative to the three-dimensional environment in accordance with the movement of the electronic device;
        in accordance with a determination that one or more first criteria are satisfied, including a first criterion that is satisfied based on the movement of the electronic device, identifying a first movement pattern corresponding to the user walking; and
        moving the user interface element relative to the viewpoint of the user in accordance with the movement of the electronic device with a first correction factor corresponding to the first movement pattern; and
        in accordance with a determination that one or more second criteria are satisfied, including a second criterion that is satisfied based on the movement of the electronic device, identifying a second movement pattern, different from the first movement pattern, corresponding to the user running; and
        moving the user interface element relative to the viewpoint of the user in accordance with the movement of the electronic device with a second correction factor, different from the first correction factor, corresponding to the second movement pattern.

2. The method of claim 1, wherein:

the one or more first criteria and the one or more second criteria include a criterion that is satisfied when a gaze of the user of the electronic device is directed to the user interface element, and the method further comprises, in response to detecting the movement of the electronic device, in accordance with a determination that the gaze of the user is not directed to the user interface element, moving the user interface element relative to the viewpoint of the user with a third correction factor that is less than the first correction factor and less than the second correction factor.

3. The method of claim 1, wherein moving the user interface element relative to the physical environment in accordance with the movement of the electronic device includes moving the user interface element in a first direction with an acceleration less than an acceleration of at least a portion of the movement of the electronic device in the first direction.

4. The method of claim 1, wherein:

the first criterion and the second criterion are satisfied when the movement of the electronic device includes periodic movement in a first dimension relative to the physical environment by a first amount, and movement in a second dimension relative to the physical environment by a second amount, moving the user interface element relative to the viewpoint of the user in accordance with the movement of the electronic device with the first correction factor includes moving the user interface element relative to the viewpoint of the user in the first dimension corresponding to the periodic movement of the electronic device in the first dimension by a magnitude greater than a magnitude of moving the user interface element relative to the viewpoint of the user in the second dimension, and moving the user interface element relative to the viewpoint of the user with the second correction factor includes moving the user interface element relative to the viewpoint of the user in the first dimension corresponding to the periodic movement of the electronic device in the first dimension by a magnitude greater than a magnitude of moving the user interface element relative to the viewpoint of the user in the second dimension.

5. The method of claim 1, wherein:

the first criterion is satisfied when the movement of the electronic device includes periodic movement in a respective dimension with a magnitude greater than a predefined threshold, moving the user interface element relative to the viewpoint of the user in accordance with the movement of the electronic device with the first correction factor comprises moving the user interface element relative to the viewpoint of the user in the respective dimension in accordance with the periodic movement of the electronic device in the respective dimension, the second criterion is satisfied when the movement of the electronic device does not include the periodic movement in the respective dimension with the magnitude greater than the predefined threshold, moving the user interface element relative to the viewpoint of the user in accordance with the movement of the electronic device with the second correction factor does not include moving the user interface element relative to the viewpoint of the user in the respective dimension in accordance with the periodic movement of the electronic device in the respective dimension.

6. The method of claim 1, wherein updating presentation of the user interface element in accordance with the movement of the electronic device further includes:

in accordance with the determination that one or more first criteria are satisfied, presenting the user interface element with a first amount of information, and in accordance with the determination that the one or more second criteria are satisfied, presenting the user interface element with a second amount of information that is greater than the first amount of information.

7. The method of claim 1, wherein updating display of the user interface element in accordance with the movement of the electronic device further includes:

in accordance with the determination that the one or more first criteria are satisfied, presenting the user interface element at a first size, and in accordance with the determination that the one or more second criteria are satisfied, presenting the user interface element at a second size smaller than the first size.

8. The method of claim 1, further comprising:

while presenting the user interface element, receiving, via the one or more input devices, an input directed to the user interface element; and in response to receiving the input directed to the user interface element:

in accordance with a determination that one or more third criteria are satisfied, performing an operation in accordance with the user interface element; and in accordance with a determination that the one or more third criteria are not satisfied, forgoing performing the operation in accordance with the user interface element.

9. An electronic device comprising:

one or more processors;

memory; and one or more programs stored in the memory and configured to be executed by the one or more processors, the one or more programs including instructions for:

presenting, using a display:

a view of a three-dimensional environment based on a physical environment of the electronic device from a viewpoint of a user of the electronic device, and at a respective location relative to the viewpoint of the user, a user interface element;

while presenting the view of the three-dimensional environment, detecting movement of the electronic device relative to the physical environment; and in response to detecting the movement of the electronic device:

updating presentation of the user interface element in accordance with the movement of the electronic device including:

moving the user interface element relative to the three-dimensional environment in accordance with the movement of the electronic device;

in accordance with a determination that one or more first criteria are satisfied, including a first criterion that is satisfied based on the movement of the electronic device, identifying a first movement pattern corresponding to the user walking; and moving the user interface element relative to the viewpoint of the user in accordance with the movement of the electronic device with a first correction factor corresponding to the first movement pattern; and in accordance with a determination that one or more second criteria are satisfied, including a second criterion that is satisfied based on the movement of the electronic device, identifying a second movement pattern, different from the first movement pattern, corresponding to the user running; and moving the user interface element relative to the viewpoint of the user in accordance with the movement of the electronic device with a second correction factor, different from the first correction factor, corresponding to the second movement pattern.

10. The electronic device of claim 9, wherein:

the one or more first criteria and the one or more second criteria include a criterion that is satisfied when a gaze of the user of the electronic device is directed to the user interface element, and the one or more programs further include instructions for, in response to detecting the movement of the electronic device, in accordance with a determination that the gaze of the user is not directed to the user interface element, moving the user interface element relative to the viewpoint of the user with a third correction factor that is less than the first correction factor and less than the second correction factor.

11. The electronic device of claim 9, wherein moving the user interface element relative to the physical environment in accordance with the movement of the electronic device includes moving the user interface element in a first direction with an acceleration less than an acceleration of at least a portion of the movement of the electronic device in the first direction.

12. The electronic device of claim 9, wherein:

the first criterion and the second criterion are satisfied when the movement of the electronic device includes periodic movement in a first dimension relative to the physical environment by a first amount, and movement in a second dimension relative to the physical environment by a second amount, moving the user interface element relative to the viewpoint of the user in accordance with the movement of the electronic device with the first correction factor includes moving the user interface element relative to the viewpoint of the user in the first dimension corresponding to the periodic movement of the electronic device in the first dimension by a magnitude greater than a magnitude of moving the user interface element relative to the viewpoint of the user in the second dimension, and moving the user interface element relative to the viewpoint of the user with the second correction factor includes moving the user interface element relative to the viewpoint of the user in the first dimension corresponding to the periodic movement of the electronic device in the first dimension by a magnitude greater than a magnitude of moving the user interface element relative to the viewpoint of the user in the second dimension.

13. The electronic device of claim 9, wherein:

the first criterion is satisfied when the movement of the electronic device includes periodic movement in a respective dimension with a magnitude greater than a predefined threshold, moving the user interface element relative to the viewpoint of the user in accordance with the movement of the electronic device with the first correction factor comprises moving the user interface element relative to the viewpoint of the user in the respective dimension in accordance with the periodic movement of the electronic device in the respective dimension, the second criterion is satisfied when the movement of the electronic device does not include the periodic movement in the respective dimension with the magnitude greater than the predefined threshold, moving the user interface element relative to the viewpoint of the user in accordance with the movement of the electronic device with the second correction factor does not include moving the user interface element relative to the viewpoint of the user in the respective dimension in accordance with the periodic movement of the electronic device in the respective dimension.

14. The electronic device of claim 9, wherein updating presentation of the user interface element in accordance with the movement of the electronic device further includes:

in accordance with the determination that one or more first criteria are satisfied, presenting the user interface element with a first amount of information, and in accordance with the determination that the one or more second criteria are satisfied, presenting the user interface element with a second amount of information that is greater than the first amount of information.

15. The electronic device of claim 9, wherein updating display of the user interface element in accordance with the movement of the electronic device further includes:

in accordance with the determination that the one or more first criteria are satisfied, presenting the user interface element at a first size, and in accordance with the determination that the one or more second criteria are satisfied, presenting the user interface element at a second size smaller than the first size.

16. The electronic device of claim 9, wherein the one or more programs further include instructions for:

while presenting the user interface element, receiving, via one or more input devices, an input directed to the user interface element; and in response to receiving the input directed to the user interface element:

in accordance with a determination that one or more third criteria are satisfied, performing an operation in accordance with the user interface element; and in accordance with a determination that the one or more third criteria are not satisfied, forgoing performing the operation in accordance with the user interface element.

17. A non-transitory computer readable storage medium storing one or more programs, the one or more programs comprising instructions, which when executed by one or more processors of an electronic device, cause the electronic device to perform a method comprising:

presenting, using a display:

a view of a three-dimensional environment based on a physical environment of the electronic device from a viewpoint of a user of the electronic device, and at a respective location relative to the viewpoint of the user, a user interface element;

while presenting the view of the three-dimensional environment, detecting movement of the electronic device relative to the physical environment; and in response to detecting the movement of the electronic device:

updating presentation of the user interface element in accordance with the movement of the electronic device including:

moving the user interface element relative to the three-dimensional environment in accordance with the movement of the electronic device;

in accordance with a determination that one or more first criteria are satisfied, including a first criterion that is satisfied based on the movement of the electronic device, identifying a first movement pattern corresponding to the user walking; and moving the user interface element relative to the viewpoint of the user in accordance with the movement of the electronic device with a first correction factor corresponding to the first movement pattern; and in accordance with a determination that one or more second criteria are satisfied, including a second criterion that is satisfied based on the movement of the electronic device, identifying a second movement pattern, different from the first movement pattern, corresponding to the user running; and moving the user interface element relative to the viewpoint of the user in accordance with the movement of the electronic device with a second correction factor, different from the first correction factor, corresponding to the second movement pattern.

18. The non-transitory computer readable storage medium of claim 17, wherein:

the one or more first criteria and the one or more second criteria include a criterion that is satisfied when a gaze of the user of the electronic device is directed to the user interface element, and the method further comprises, in response to detecting the movement of the electronic device, in accordance with a determination that the gaze of the user is not directed to the user interface element, moving the user interface element relative to the viewpoint of the user with a third correction factor that is less than the first correction factor and less than the second correction factor.

19. The non-transitory computer readable storage medium of claim 17, wherein moving the user interface element relative to the physical environment in accordance with the movement of the electronic device includes moving the user interface element in a first direction with an acceleration less than an acceleration of at least a portion of the movement of the electronic device in the first direction.

20. The non-transitory computer readable storage medium of claim 17, wherein:

the first criterion and the second criterion are satisfied when the movement of the electronic device includes periodic movement in a first dimension relative to the physical environment by a first amount, and movement in a second dimension relative to the physical environment by a second amount, moving the user interface element relative to the viewpoint of the user in accordance with the movement of the electronic device with the first correction factor includes moving the user interface element relative to the viewpoint of the user in the first dimension corresponding to the periodic movement of the electronic device in the first dimension by a magnitude greater than a magnitude of moving the user interface element relative to the viewpoint of the user in the second dimension, and moving the user interface element relative to the viewpoint of the user with the second correction factor includes moving the user interface element relative to the viewpoint of the user in the first dimension corresponding to the periodic movement of the electronic device in the first dimension by a magnitude greater than a magnitude of moving the user interface element relative to the viewpoint of the user in the second dimension.

21. The non-transitory computer readable storage medium of claim 17, wherein:

the first criterion is satisfied when the movement of the electronic device includes periodic movement in a respective dimension with a magnitude greater than a predefined threshold, moving the user interface element relative to the viewpoint of the user in accordance with the movement of the electronic device with the first correction factor comprises moving the user interface element relative to the viewpoint of the user in the respective dimension in accordance with the periodic movement of the electronic device in the respective dimension, the second criterion is satisfied when the movement of the electronic device does not include the periodic movement in the respective dimension with the magnitude greater than the predefined threshold, moving the user interface element relative to the viewpoint of the user in accordance with the movement of the electronic device with the second correction factor does not include moving the user interface element relative to the viewpoint of the user in the respective dimension in accordance with the periodic movement of the electronic device in the respective dimension.

22. The non-transitory computer readable storage medium of claim 17, wherein updating presentation of the user interface element in accordance with the movement of the electronic device further includes:

in accordance with the determination that one or more first criteria are satisfied, presenting the user interface element with a first amount of information, and in accordance with the determination that the one or more second criteria are satisfied, presenting the user interface element with a second amount of information that is greater than the first amount of information.

23. The non-transitory computer readable storage medium of claim 17, wherein updating display of the user interface element in accordance with the movement of the electronic device further includes:

in accordance with the determination that the one or more first criteria are satisfied, presenting the user interface element at a first size, and in accordance with the determination that the one or more second criteria are satisfied, presenting the user interface element at a second size smaller than the first size.

24. The non-transitory computer readable storage medium of claim 17, wherein the method further comprises:

while presenting the user interface element, receiving, via one or more input devices, an input directed to the user interface element; and in response to receiving the input directed to the user interface element:

in accordance with a determination that one or more third criteria are satisfied, performing an operation in accordance with the user interface element; and in accordance with a determination that the one or more third criteria are not satisfied, forgoing performing the operation in accordance with the user interface element.

* * * * *